US009141948B2

(12) United States Patent
Dickelman

(10) Patent No.: US 9,141,948 B2
(45) Date of Patent: Sep. 22, 2015

(54) CONTROL SYSTEM ARRANGEMENTS AND METHODS FOR DISPARATE NETWORK SYSTEMS

(75) Inventor: Mark Dickelman, Inverness, IL (US)

(73) Assignee: U.S. Bank National Association, Cincinnati, OH (US)

( * ) Notice: Subject to any disclaimer, the term of this patent is extended or adjusted under 35 U.S.C. 154(b) by 215 days.

(21) Appl. No.: 12/901,347

(22) Filed: Oct. 8, 2010

(65) Prior Publication Data

US 2011/0071892 A1  Mar. 24, 2011

Related U.S. Application Data

(63) Continuation-in-part of application No. 12/323,127, filed on Nov. 25, 2008.

(60) Provisional application No. 60/991,379, filed on Nov. 30, 2007.

(51) Int. Cl.
*G06Q 20/20* (2012.01)
*G07G 1/14* (2006.01)
*G06Q 30/02* (2012.01)
*G06Q 20/04* (2012.01)
*G06Q 20/40* (2012.01)

(52) U.S. Cl.
CPC .............. *G06Q 20/20* (2013.01); *G06Q 20/202* (2013.01); *G06Q 30/0215* (2013.01); *G06Q 30/0238* (2013.01)

(58) Field of Classification Search
USPC .............. 705/14, 35, 40, 14.23, 14.35, 14.36, 705/14.66, 14.71, 21, 39, 42; 364/408; 235/379, 382, 382.5
See application file for complete search history.

(56) References Cited

U.S. PATENT DOCUMENTS

| | | | |
|---|---|---|---|
| 5,424,938 A * | 6/1995 | Wagner et al. | 705/42 |
| 5,465,206 A | 11/1995 | Hilt et al. | |
| 5,596,642 A | 1/1997 | Davis et al. | |
| 5,596,643 A | 1/1997 | Davis et al. | |
| 5,649,117 A | 7/1997 | Landry | |
| 5,649,118 A | 7/1997 | Carlisle et al. | |
| 5,650,604 A | 7/1997 | Marcous et al. | |
| 5,717,989 A | 2/1998 | Tozzoli et al. | |
| 6,070,150 A | 5/2000 | Remington et al. | |
| 6,292,789 B1 | 9/2001 | Schutzer | |
| 6,298,335 B1 | 10/2001 | Bernstein | |
| 6,529,187 B1 | 3/2003 | Dickelman | |
| 7,092,913 B2 | 8/2006 | Cannon, Jr. | |
| 7,174,302 B2 | 2/2007 | Patricelli et al. | |
| 7,280,981 B2 | 10/2007 | Huang et al. | |
| 7,464,859 B1 | 12/2008 | Hawkins | |

(Continued)

*Primary Examiner* — Matthew Gart
*Assistant Examiner* — Reva R Danzig
(74) *Attorney, Agent, or Firm* — Crawford Maunu PLLC

(57) ABSTRACT

Electronic transaction data sets are processed for a multitude of disparate transactions using a plurality of autonomous payment networks. Consistent with one example system, a software-programmed computer type system receives and processes point-of-sale transaction data to select one of the payment networks associated with a participant ID (e.g., for a buyer or seller) in the transaction data. The system includes a plurality of network-specific interface modules, each associated with a specific payment network for interfacing therewith. For point-of-sale transaction data, the interface module corresponding to the selected payment network communicates payment data to the selected payment network to effect electronic payment for the point-of-sale transaction data.

27 Claims, 10 Drawing Sheets

(56) References Cited

U.S. PATENT DOCUMENTS

| | | |
|---|---|---|
| 7,584,151 B2 | 9/2009 | Wells et al. |
| 7,590,557 B2 | 9/2009 | Harrison et al. |
| 7,627,523 B1 | 12/2009 | Symonds et al. |
| 7,661,586 B2 | 2/2010 | Robbins, Jr. et al. |
| 7,664,690 B2 | 2/2010 | Dirnberger et al. |
| 7,680,679 B1 | 3/2010 | Patricelli et al. |
| 7,702,530 B2 | 4/2010 | Pearson |
| 7,702,553 B1 | 4/2010 | Dickelman |
| 7,702,577 B1 | 4/2010 | Dickelman |
| 7,711,621 B2 | 5/2010 | Huang et al. |
| 2001/0014878 A1 | 8/2001 | Mitra et al. |
| 2002/0002495 A1 | 1/2002 | Ullman |
| 2002/0111886 A1 | 8/2002 | Chenevich et al. |
| 2002/0111915 A1 | 8/2002 | Clemens et al. |
| 2002/0111916 A1 | 8/2002 | Coronna et al. |
| 2002/0145051 A1 | 10/2002 | Charrin |
| 2002/0184147 A1 | 12/2002 | Boulger |
| 2003/0009382 A1 | 1/2003 | D'Arbeloff et al. |
| 2003/0061147 A1 | 3/2003 | Fluhr et al. |
| 2003/0061157 A1 | 3/2003 | Hirka et al. |
| 2004/0024703 A1 | 2/2004 | Roskind |
| 2004/0030657 A1 | 2/2004 | Holm-Blagg et al. |
| 2004/0044621 A1 | 3/2004 | Huang et al. |
| 2004/0080691 A1 | 4/2004 | Mi et al. |
| 2004/0093302 A1 | 5/2004 | Baker et al. |
| 2005/0060579 A1 | 3/2005 | Dickelman et al. |
| 2005/0077350 A1 | 4/2005 | Courtion et al. |
| 2005/0154639 A1* | 7/2005 | Zetmeir ........................ 705/14 |
| 2005/0222961 A1 | 10/2005 | Staib et al. |
| 2005/0267840 A1 | 12/2005 | Holm-Blagg et al. |
| 2006/0089906 A1 | 4/2006 | Rowley |
| 2006/0116957 A1* | 6/2006 | May et al. ..................... 705/40 |
| 2007/0038577 A1 | 2/2007 | Werner et al. |
| 2007/0282743 A1 | 12/2007 | Lovelett et al. |
| 2008/0046358 A1 | 2/2008 | Holm-Blagg et al. |
| 2008/0097882 A1* | 4/2008 | Rowe et al. ..................... 705/35 |
| 2008/0103985 A1 | 5/2008 | Huang et al. |
| 2008/0154757 A1* | 6/2008 | Barros et al. ................... 705/35 |
| 2008/0275748 A1 | 11/2008 | John |
| 2008/0306838 A1 | 12/2008 | Fleet et al. |
| 2008/0307034 A1 | 12/2008 | Fleet et al. |
| 2009/0030848 A1 | 1/2009 | Wendel |

* cited by examiner

CONTROL SYSTEM ARRANGEMENTS AND METHODS FOR DISPARATE NETWORK SYSTEMS

RELATED PATENT DOCUMENTS

This patent document is a continuation-in-part under 35 U.S.C. §120 of U.S. patent application Ser. No. 12/323,127, entitled "Control System Arrangements and Methods for Disparate Network Systems" to Dickelman, Mark and filed on Nov. 25, 2008; which claims the benefit, under 35 U.S.C. §119(e), of U.S. Provisional Patent Application Ser. No. 60/991,379, entitled "Control System Arrangements and Methods for Disparate Network Systems" to Dickelman, Mark and filed on Nov. 30, 2007; each of which is fully incorporated herein by reference as describing and illustrating subject matter (in part(s) or in its entirety) that can be practiced with the subject matter disclosed herein.

FIELD OF THE INVENTION

This disclosure relates generally to computer-automated devices, systems and methods, and as an example, to systems and methods for automated computer systems and networks implemented as may be found in a control center of a financial institution.

OVERVIEW

Computer systems and networks that process data in control centers for financial institutions have struggled to keep up with the ever increasingly complex and expanding variety of electronic transaction and accounting data, particularly as more and more transactions are carried out using electronic payment, which is often a credit-based payment. Electronic data used in effecting payment relates and leads up to implementations of payment systems and associated payment networks, which generally employ proprietary-type processing functions and require relatively complex interactivity with electronic systems operated by entities for which payment is processed (e.g., merchant point-of-sale (POS) devices). These systems have often been susceptible to issues of compatibility and complex negotiations required for any integration and cross-network use.

Generally, associated payment networks involve two primary components. The first component is a seller or merchant access network (e.g., Elavon®) that provides connection to the POS devices (e.g., directly or via merchant internal networks) and identification of the type of payment account (e.g., Visa® or Voyager®). A second component includes payment processing networks that process payment instructions based on established agreements by parties participating in the processing of a payment. Generally, these payment processing networks are one of two different categories, proprietary networks (e.g., Voyager®) or association networks.

Examples of association networks include the networks provided by VISAS and MASTERCARD® and/or the particular acquiring/issuing banks. For a particular transaction, the operator of the association network controls the flow of funds for the transaction. Often, this includes a fee that is passed on to the seller, such as a percentage of the transaction. The participating sellers have an agreement with the network (e.g., VISA® or MASTERCARD®), but do not have a transactional relationship between one another with respect to the association network transactions. These types of transactions have generally been implemented by sellers having an existing relationship with a particular bank, and often involve the use of a transaction card or corresponding account involving one or more of a credit or debit type of account structure. When a purchase is made, the seller sends transaction information to the bank, which is sometimes referred to as the acquiring bank. The acquiring bank can forward payment information to another bank that issued the buyer's account (e.g., a credit card issuer), which is often referred to as an issuing bank. In many instances, payment processing networks assign interchange fees for these types of transactions. These fees are paid between the parties based on the type of transaction, authentication and location, and may be passed on to the seller.

An example proprietary network involves a merchant-provided in-store credit or debit account (e.g., an account provided by Target Corporation for use in purchasing goods from a store operated thereby). A seller or a seller-contracted third party facilitates the settlement, authorization and/or other functions associated with transactions involving the in-store account. In some instances, sellers form bilateral agreements with other sellers to allow use of a network by multiple sellers and/or to coordinate the use of multiple networks between multiple sellers. For instance, two department stores may form an agreement to allow the use of a common proprietary network card/account at either store, or they may allow use of two different proprietary network cards/accounts (i.e., one from each store) at either store.

A few networks are operated to allow a single (multi-purpose) card (e.g., a physical transaction card with data thereon, or a corresponding account) to provide access to more than one related credit and/or debit type of account. The card interfaces with a network that would otherwise support one or more of the accounts, and a user of the card (cardholder) can designate a desired one of the accounts to use. However, the buyer must still carry the multi-purpose card for use and can only use the multi-purpose card at locations that support that particular card, and the transactions are generally processed using the selected account and its related proprietary-type of payment network.

In this complex and ever expanding background of various payment networks, consumers have an increasing number of accounts from which they can access funds for purchases (e.g., credit, debit, insurance, health-savings accounts, money markets, investment and retirement). These accounts can vary with respect to their respective fees, tax implications, interest rates, limitations on withdraw amounts and a number of other properties. Often the consumer is forced to spend considerable time and effort to manage such accounts and associated transactions. For example, considerable time and effort can be expended in determining how to best apply specific transactions and/or purchased items to the various accounts. In some instances, the actual implementation of such a determination can be just as difficult.

Another challenge to the implementation and management of transaction processing systems and, to some degree, merchant-specific types of accounts relates to the lack of volume of buyers (and/or sellers) that may be associated with the systems and accounts. For instance, relatively small merchants may find it difficult to promote and operate a transaction account and related system where the volume of users is relatively low.

The above and other matters remain challenging to the implementation, operation and sustained growth of card and related types of accounts, and the electronic transactions and interactions related to the same.

SUMMARY

The present disclosure is exemplified in a number of embodiments, implementations and applications, some of which are summarized below.

According to an example embodiment of the present disclosure, a computer circuit arrangement is configured to facilitate electronic payment between disparate autonomous payment networks respectively having network-specific payment processing protocols, the circuit arrangement comprising: a point-of-sale interface circuit to receive, for each transaction, electronic point-of-sale transaction data from a remote point-of-sale device; a plurality of payment network interface circuits to electronically communicate with associated payment networks using protocols specific to the associated payment network to which communications are sent; and a control processor circuit configured to, for each transaction and point-of-sale transaction data received therefor, use the point-of-sale transaction data to identify participant ID data for at least one participant in the transaction, retrieve business rules data electronically associated with the participant ID data, the business rules data including information identifying rewards programs associated with the associated payment networks, compare the rewards programs using the retrieved business rules data, select one of the payment network interface modules to process electronic payment for the transaction based, at least in part, upon the comparison of the rewards program and control the selected payment network interface module to electronically communicate payment data for the transaction data to the network interface module's associated payment network, using protocols specific to the associated payment network, to facilitate payment for the transaction.

According to an example embodiment of the present disclosure, a processor-readable non-transitory storage medium is provide that has instructions stored thereon that when executed by one or more computer processors perform steps to facilitate electronic payment between disparate autonomous payment networks respectively having network-specific payment processing protocols. The steps include: receiving, for each transaction, electronic point-of-sale transaction data from a remote point-of-sale device; electronically communicating with associated payment networks using protocols specific to the associated payment network to which communications are sent; and for each transaction and point-of-sale transaction data received therefor, using the point-of-sale transaction data to access participant identification data for at least one participant in the transaction, retrieving business rules data electronically associated with the participant ID data, calculating, for each of the associated payment networks, a net cost to the at least one participant using indications, from the retrieved business rules, of fees and rewards associated with each of the associated payment networks, using the calculated net cost to select one of the payment network interface modules to process electronic payment for the transaction, and controlling the selected payment network interface module to electronically communicate payment data for the transaction data to the module's associated payment network, using protocols specific to the associated payment network, to facilitate payment for the transaction.

According to various embodiments of the present disclosure, a processor-readable non-transitory storage medium is provided with instructions stored thereon for performing steps to facilitate electronic payment between disparate autonomous payment networks respectively having network-specific payment processing protocols, the steps including receiving, for each transaction, electronic point-of-sale transaction data from a remote point-of-sale device; electronically communicating with associated payment networks using protocols specific to the associated payment network to which communications are sent; and for each transaction and point-of-sale transaction data received therefor, using the point-of-sale transaction data to identify participant ID data for at least one participant in the transaction, retrieving business rules data electronically associated with the participant ID data, identifying, from the retrieved business rules, a rewards goal associated with one or more of the associated payment networks, using the identified rewards goal to select one of the payment network interface modules to process electronic payment for the transaction, and controlling the selected payment network interface module to electronically communicate payment data for the transaction data to the module's associated payment network, using protocols specific to the associated payment network, to facilitate payment for the transaction.

Consistent with another embodiment of the present disclosure, a system includes at least one computer-readable non-transitory storage medium having instructions stored thereon; one or more computer processors that when executing the instructions operate to facilitate electronic payment between disparate autonomous payment networks respectively having network-specific payment processing protocols, including receiving, for each transaction, electronic point-of-sale transaction data from a remote point-of-sale device; electronically communicating with associated payment networks using protocols specific to the associated payment network to which communications are sent; for each transaction and point-of-sale transaction data received therefor, using the point-of-sale transaction data to identify participant ID data for at least one participant in the transaction, retrieving business rules data electronically associated with the participant ID data, using the retrieved business rules data to select one of the payment network interface modules to process electronic payment for the transaction, and controlling the selected payment network interface module to electronically communicate payment data for the transaction data to the module's associated payment network, using protocols specific to the associated payment network, to facilitate payment for the transaction; accumulating, for the at least one participant, a shared pool of rewards points in response to use of different ones of the associated payment networks to facilitate payment for transactions; and redeeming the rewards points from the shared pool to provide a reward to the at least one participant.

Another embodiment of the present disclosure is directed towards a system comprising at least one processor-readable non-transitory storage medium having instructions stored thereon; one or more computer processors that when executing the instructions are configured to facilitate electronic payment between disparate autonomous payment networks respectively having network-specific payment processing protocols by: receiving, for each transaction, electronic point-of-sale transaction data from a remote point-of-sale device; electronically communicating with associated payment networks using protocols specific to the associated payment network to which communications are sent; for each transaction and point-of-sale transaction data received therefor, using the point-of-sale transaction data to identify participant ID data for at least one participant in the transaction, retrieving business rules data electronically associated with the participant ID data, determine, for the plurality of payment networks, eligibility of the transaction for one or more rewards programs, using the retrieved business rules data and the determination of eligibility to select one of the payment network interface modules to process electronic payment for the transaction, and controlling the selected payment network interface module to electronically communicate payment data for the transaction data to the module's associated payment network, using protocols specific to the associated payment network, to facilitate payment for the transaction.

Embodiments of the present disclosure are also directed towards a system with at least one processor-readable storage medium having instructions stored thereon; one or more computer processors that when executing the instructions are configured to facilitate electronic payment between disparate autonomous payment networks respectively having network-specific payment processing protocols by: receiving, for each transaction, electronic point-of-sale transaction data from a remote point-of-sale device; electronically communicating with associated payment networks using protocols specific to the associated payment network to which communications are sent; for each transaction and point-of-sale transaction data received therefor, using the point-of-sale transaction data to identify participant ID data for at least one participant in the transaction, retrieving business rules data electronically associated with the participant ID data, identifying, from the retrieved business rules, whether the transaction qualifies for automated savings participation, using the retrieved business rules data to select one of the payment network interface modules to process electronic payment for the transaction, controlling the selected payment network interface module to electronically communicate payment data for the transaction data to the module's associated payment network, using protocols specific to the associated payment network, to facilitate payment for the transaction, and increasing, in response to identifying that the transaction qualifies, the amount of savings in the account for accumulating automated savings.

Consistent with other embodiments of the present disclosure, a processor-readable storage medium has instructions stored thereon for performing steps to facilitate electronic payment between disparate autonomous payment networks respectively having network-specific payment processing protocols, the steps including: receiving, for each transaction, electronic point-of-sale transaction data from a remote point-of-sale device; electronically communicating with associated payment networks using protocols specific to the associated payment network to which communications are sent; for each transaction and point-of-sale transaction data received therefor, using the point-of-sale transaction data to identify participant ID data for at least one participant in the transaction, retrieving business rules data electronically associated with the participant ID data, using the retrieved business rules data to select one of the payment network interface modules to process electronic payment for the transaction, controlling the selected payment network interface module to electronically communicate payment data for the transaction data to the module's associated payment network, using protocols specific to the associated payment network, to facilitate payment for the transaction, identifying, from the retrieved business rules, whether the transaction qualifies for automated savings participation, determining a transaction fee assessed to participants in the transaction, and increasing, in response to identifying that the transaction qualifies, the amount of savings in the account for accumulating automated savings by an amount calculated from the determined transaction fee.

The above summary is not intended to describe each illustrated embodiment or every implementation of the present disclosure.

BRIEF DESCRIPTION OF THE DRAWINGS

The disclosure may be more completely understood in consideration of the detailed description of various embodiments of the disclosure that follows in connection with the accompanying drawings, in which.

Figure 1A:
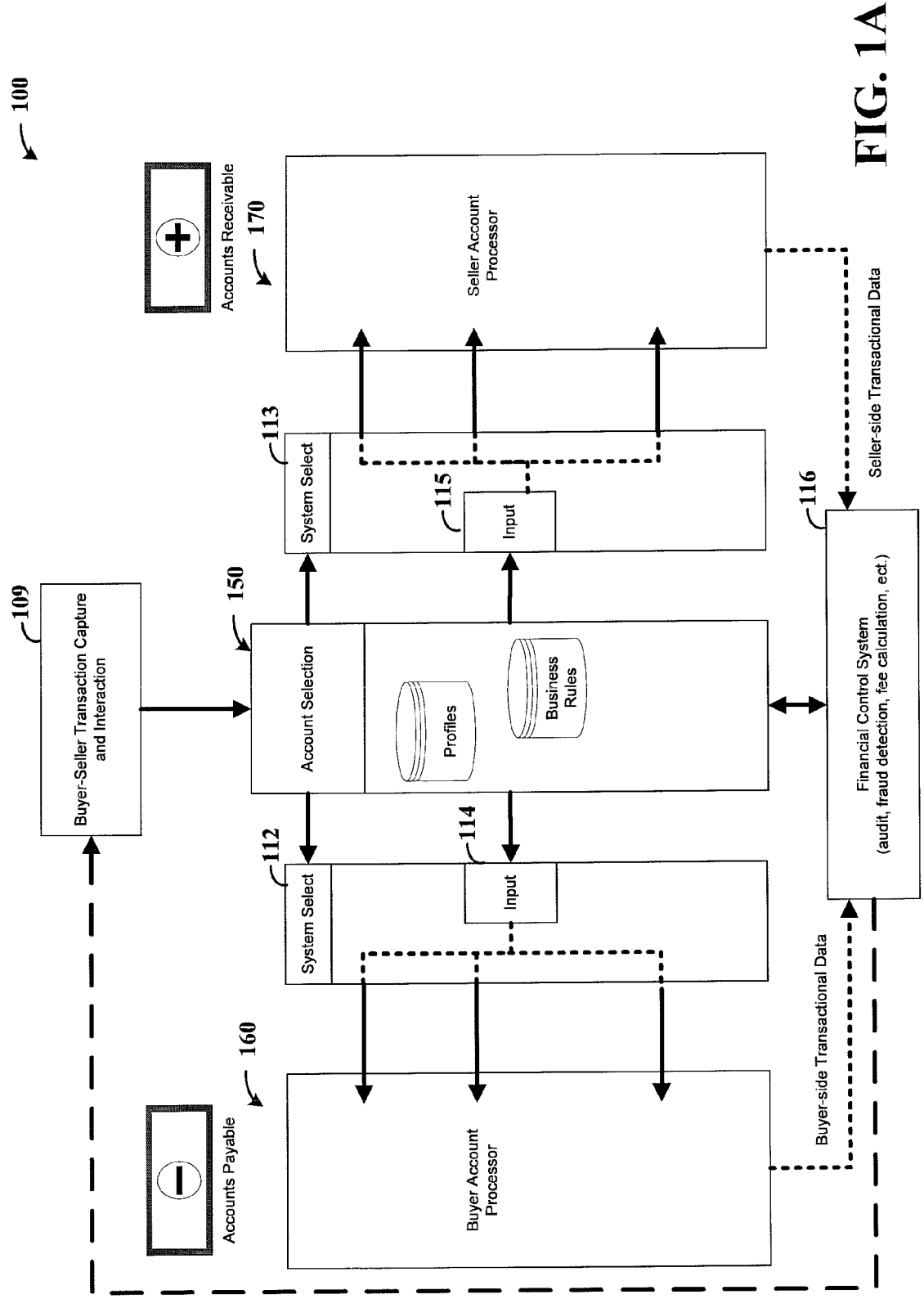
FIG. 1A shows a system for implementing a transaction using disparate seller and buyer networks, according to an example embodiment of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

The present disclosure is believed to be applicable to a variety of different types of transaction processing systems and related integrated communications, management control, and has been found to be particularly useful for applications involving disparate, autonomous payment networks. While the present disclosure is not necessarily limited to such approaches, various aspects of the disclosure may be appreciated through a discussion of various examples using these and other contexts.

A number of different embodiments of the present disclosure are directed to one or more of the components and methods described, in this document, in connection with disparate payment systems. Particular embodiments relate to tracking, monitoring and controlling payments made to disparate payment systems as a function of rewards provided or earned in connection with the payments. Other embodiments relate to accumulation of small transaction values (e.g., rewards points or purchase amounts) into a single transaction or account in connection with multiple disparate payment systems. A discussion of the overall system functionality can be useful in understanding the individual components and methods.

Consistent with an example embodiment of the present disclosure, an approach to processing payment involves controlling interactions between disparate, autonomous payment processing networks to process different payment aspects for a common set of transaction data received for a particular transaction. For instance, when a merchant (i.e., seller) transmits point-of-sale purchase data including a transaction amount and buyer's account data (e.g., obtained from a credit-type or debit-type card or related account number associated therewith), an integrated processor receives the point-of-sale data and coordinates electronic funds transfers with two or more of the autonomous networks. In this context, a single card or account can be used as a manner in which to access a plurality of payment networks, and payment for a common transaction can be effected using disparate, autonomous networks that, absent the integrated processor, would not otherwise be capable of communicating with one another. In many aspects, such an approach involves interacting with payment networks configured and operated for operating independently, to respectively provide payment to a merchant and effect settlement from a buyer, with these functions now carried out via the integrated processor.

These payment processing approaches are amenable to use in processing payment using a multitude of different payment approaches and scenarios involving one or more accounts and participating networks for buyers, merchants or other transaction participants. For example, some embodiments are directed to providing payment from a buyer using a first payment processing network (e.g., a Elavon® and/or VISA® network as described above) to obtain account information for the buyer, and providing settlement to a merchant using a different account (and its related payment network) for the buyer. Other embodiments are directed to using different accounts and related payment networks for effecting payment and for providing settlement for the buyer. Other embodiments are directed to using different accounts and related payment networks for collecting an initial pre-payment (e.g., an immediate payment from a third party) for collecting subsequent payment from the buyer and, where appropriate, for providing settlement for the pre-payment. Still other embodiments are directed to providing payment from a buyer using an account for the buyer and its related payment processing network, and providing electronic funds from the payment to a merchant account that uses a different payment network. Other combinations of networks are also used in connection with various embodiments.

As should be appreciated, the central/integrated processor can thus coordinate interactions between a multitude of different accounts and different payment networks, and can do so using a single account for a particular transaction participant in order to access other accounts for the participant. For instance, in a transaction involving the sale of goods or services from a seller to a buyer, a payment network can be selected for the buyer that is disparate from the payment network used by seller by using a standardized card or a proprietary network, or other buyer identification sufficient upon which to authorize payment. This can be useful for allowing a buyer to use a standardized card and a seller having only access to (or preferring the use of) a proprietary network. Payment authorization may involve an audit, which may include comparing data from one or more of a buyer-based audit, seller-based audit or an audit based upon a third party operating the central/integrated processor. The results of the audit can be provided to the selected networks and used, for example as indication that the transaction can go forward (e.g., validation regarding the transaction amount and source).

Payment accounts and related networks are selected using one or more of a variety of approaches. In some embodiments, user profiles with any appropriate rules are stored and used to identify and select an available account for effecting payment for a transaction. These profiles (and rules) can be stored for buyers and, as appropriate, sellers. In some applications, an account and related payment network is selected automatically using profiles and related rules. In other instances, user input is obtained in order to select a payment account, to allow a buyer and/or seller to directly select and control the use of a particular payment account. In all of these instances, parties to a particular transaction need not have direct knowledge of account and related payment network for other parties to the transaction, and further do not need to participate in any agreement with a payment network used by another party. In addition, such approaches may be carried out using a processor (e.g., a computer) that uses profiles, rules and transaction information for selecting, routing and otherwise implementing associated accounts and related payment networks.

While not necessarily limited thereto, various embodiments are directed to the implementation of processor arrangements and systems, consistent with discussion herein, at financial institutions such as banking institutions that are well suited for making use of network and account access. For instance, banking institutions have many existing interfaces to payment networks, and many payment networks are linked to accounts held at a banking institution. The payment networks operate by transferring money to and from these accounts, thereby completing transactions. Other payment networks use local banking institutions as intermediaries to transfer funds. The use of a bank can be beneficial for a number of reasons including, but not limited to, secured transactions, federal insurance and relative stability; however, disparate payment networks do not have automated mechanisms to transfer funds therebetween.

Aspects of the present disclosure, when implemented by a banking institution, can provide automated access between such networks. In some instances, the transactions can be implemented with the transaction details being transparent to the payment networks and/or the individual participants. For example, an individual participant could identify a desired payment network to use without requiring that a front-end payment network (e.g., the payment network associated with the POS transaction) have a preexisting bilateral agreement with a desired payment network. A specific example of such an instance involves a buyer's use of a credit card to implement a POS transaction. Consistent with one implementation of the present disclosure, credit card transaction data is received by a banking institution, which can use a payment routing network to select a payment network, other than a payment network associated with the credit card, to complete the transaction. Accordingly, the aspects of the present disclosure can be particularly useful for providing a centralized routing system that operates using existing autonomous and disparate payment networks. Moreover, these approaches may be carried out using an identification of a user, be that based upon a particular payment account (e.g., a credit card) or based upon another form of identification (e.g., a mobile phone account or a state-issued identification card, such as driver's license), where payment is carried out using a wholly different payment account. That is, once a buyer is identified into the system, using one or more of a multitude of identification approaches, payment accounts and networks can be selected and implemented independent from any manner in which that buyer is identified. Seller accounts and networks can be similarly selected.

Turning now to the figures, FIG. 1A shows a system 100 for processing transactions using disparate payment processing networks, according to various example embodiments of the present disclosure. The system 100 can be operated in accordance with one or more of the above-discussed electronic payment and transaction processing systems and approaches, as well as those discussed in connection with the figures and those claimed. In these contexts, disparate buyer and seller networks may involve networks operating on different accounts that are not recognized or otherwise accessible by other respective buyer and/or seller networks that operate with the system 100, and can be respectively used in processing electronic payment for a transaction using two or more of the disparate networks.

When electronic transaction information is received (e.g., from a merchant's point-of-sale device), the system 100 identifies the buyer in the transaction and determines whether payment for a transaction is appropriate using a set of rules embodied and processed in a financial control system 116. For instance, when a buyer wishes to purchase goods and services from a seller (merchant), the buyer can provide account information such as a credit card number to a seller either physically (i.e., at a store) or electronically when purchasing over the Internet. This information is captured together with sufficient information to identify transaction aspects (e.g., an amount), and is provided to the system 100, which uses the information to approve and otherwise process the payment for the transaction in accordance with the buyer's account rules.

A buyer/seller transaction capture interface 109 captures data for transactions between buyers and sellers using, for example, a network-based interface (e.g., operating over the Internet) and/or a merchant/seller point-of-sale device that captures account information from a buyer (e.g., using an identification card, credit card or debit card). Where a point-of-sale device is used to interact with a buyer, the interaction may simply involve allowing the buyer's card to be swiped, or involve a more complex acquisition of other inputs or selections from the buyer. Numerous other interfaces can also be implemented in accordance with these embodiments, with some of these interfaces and related approaches discussed in further detail herein.

The data captured by the interface 109 varies depending upon the application, and generally includes data pertinent to effecting payment for a transaction, such as identification for a buyer and a seller (and/or their respective accounts), as well as a transaction amount for payment. Where appropriate, other transaction data such as time-stamps, transaction type (e.g., Internet purchase, storefront purchase, utility payments or gasoline purchases), a type of goods or services sold, or security information is also captured. Exemplary types of security information that may be provided with the transaction data include personal pin numbers, biometric data, passwords, social security numbers and interactive authentication data received via an external communication device such as via email or a cellular phone.

An account selection processor 150 uses the captured data together with profiles and business rules to select buyer and seller account/payment systems and input the selections to system selection processors 112 and 113, via inputs 114 and 115. The system selection processors 112 and 113 respond to the inputs by respectively selecting buyer and seller account processors 160 and 170, which each respectively interact with an autonomous payment network. The buyer and seller account processors 160 and 170 respectively interact with payment networks for the particular account for which transactions are processed to process payment from a buyer and provide funds to a seller, less any associated transaction fees. Fee calculation and/or collection may involve, for example, applying standard network fees (e.g., credit card basis points, cost-per-use fee, interest and/or float costs), system implementer cost and associated fees, and fees corresponding to write-offs (e.g., due to disputes and underwriting).

Each of the account selection, system selection and buyer/seller account processor functions may be implemented using, for example, one or more processors that are local and/or separate from one another, and that execute code to carry out the account and system selection and related interaction as appropriate. Account/system selection decisions can thus be made using one or more of a variety of criteria including those discussed above.

A financial control system 116 selectively interacts with one or more of the account selection processor 150 and the buyer and seller account processors 160 and 170 to control financial aspects of transactions. The control system 116 thus may control one or more of auditing for payment authorization or other purposes, fraud detection (e.g., by monitoring activity), fee calculation, compliance with government or other rules/laws, and other related functions. Moreover, this control may be effected using interaction with one or both of the account selection processor 150, buyer processor 160 and seller processor 170, and may further involve modifying aspects of transactions according to such auditing, fraud, compliance and other conditions.

Interaction with buyer and seller payment networks via processors 160 and 170 varies depending upon the application. In some instances, the interface passes transaction data for approval/authorization, such as by passing a transaction amount to a buyer's payment network, and interacts with seller systems (e.g., a point-of-sale terminal) to approve transactions based upon a response from the buyer's network. In these contexts, and as may be implemented in a manner consistent with the above discussion made prior to the introduction of FIG. 1A, the system 100 can be used to provide interaction between disparate buyer and seller payment networks, and a transaction source such as a merchant point-of-sale device or related network-based device. These interactions may be carried out in a manner that would, for example, otherwise not be possible with various networks on the buyer and/or seller sides operating using proprietary processing functions and related programming that are otherwise not amenable to interactive payment processing.

As discussed above, a variety of transactions may be carried out using disparate payment networks using the system 100. In one use-case scenario, a buyer purchasing goods from a merchant uses her credit card at a merchant's store by swiping the credit card through the merchant's card reader. Electronic data from the reader is sent to the interface 109 together with data identifying the seller and an amount for the transaction. The interface 109 provides the electronic data to the account selection processor 150, which uses profiles to identify the buyer and merchant, and business rules to select respective accounts. For instance, the buyer may specify that payments be drawn from her debit card account for transactions at or below $50, and that payments be drawn from her credit card account for transactions above $50. These accounts may or may not have a bearing upon the credit card swiped at the merchant. The merchant may similarly specify (in its business rules) a particular payment network and related account to use for receiving payment from the buyer. The account selection processor 150 accordingly selects an account based upon any such rules, and provides an input (114, 115) to respective system selection processors (112, 113), which select an appropriate account processor to interact with respective payment networks to carry out the buyer and merchant sides of the electronic transaction.

Figure 1B:
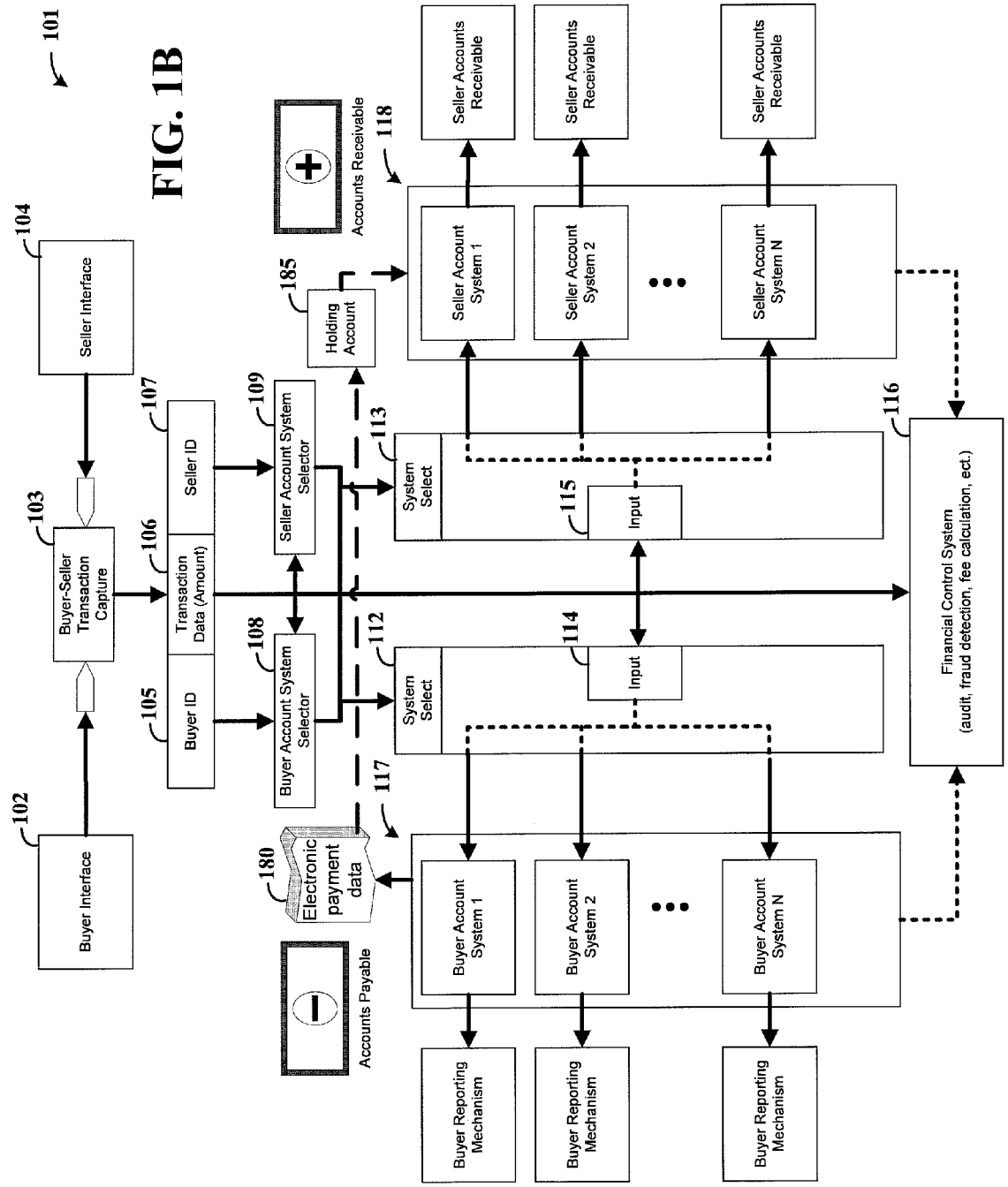
FIG. 1B shows a system for implementing a transaction using disparate seller and buyer networks, according to another example embodiment of the present disclosure.

FIG. 1B shows a system 101 for transaction processing and operation in a manner similar to that shown in and discussed in connection with the system 100 in FIG. 1A, according to another example embodiment of the present disclosure. The system 101 includes a buyer interface 102 and a seller interface 104, which may be distinct or part of a common arrangement, and which respectively capture buyer and seller transaction data. The buyer interface may include a computer operating on the Internet to receive account data from the buyer, thus involving distinct and common aspects including a buyer's Internet access appliance and a seller's server. A seller's interface may include a point-of-sale card reading device and accompanying system, which may also effectively interface with the buyer either by simply allowing the buyer to swipe a transaction card (e.g., debit or credit card) or identification, or by acquiring other inputs or selections from the buyer. Numerous other interfaces can also be implemented in accordance with these embodiments, with some of these interfaces and related approaches discussed in further detail herein.

A transaction data capture processor 103 effectively collects and/or provides data including buyer identification 105, seller identification 107 and transaction data 106 including a transaction amount. Where appropriate, the transaction data 106 includes other transaction information such as timestamps, transaction type, type of goods or services sold, or security information. Exemplary types of security information that may be provided with the transaction data 106 include personal pin numbers, biometric data, passwords, social security numbers and interactive authentication data received via an external communication device such as via Internet-based email, a mobile phone or other handheld device.

The buyer and seller IDs are respectively used for selecting buyer and seller accounts at 108 and 109, which respectively provide that information to system selection and routing processors 108 and 109, which route and process accounts payable and accounts receivable types of electronic data to one of a variety of disparate buyer and seller account systems 117 and 118. For example, as discussed above in FIG. 1A, each of the respective buyer and seller accounts may be selected by retrieving a profile for the participant and using the retrieved profile, together with any business rules, to select an appropriate payment network. In some instances, the selected network can be determined without knowledge of the other participant, such as by selecting a payment network from which to draw funds (or debit) for a buyer, irrespective of the seller's selected payment network by which it expects to receive payment. In other instances, the selection of a payment network for a particular transaction participant (e.g., a buyer) involves also using a profile of the other participant (e.g., a seller), for purposes such as cost savings or security. For instance, a particular network may be selected because a seller has a favorable bilateral agreement with a network that is usable by a buyer transacting with the seller.

In some embodiments, transaction data 105/106/107 is packaged for sending to two different networks, with each network receiving selective information that is proprietary to that network's account or accounts having a bearing upon the transaction. The system 101 separates buyer and seller information (e.g., identification and/or security data) from one another, so that each network receives only that information pertinent to payment approval and/or processing at that network. In this context, the system 101 maintains the confidentiality of account information while allowing disparate networks to function in accordance with their approval and/or processing schemes.

In some implementations, the selected buyer and seller account systems (at 117, 118) interact, through the system 101, for communicating electronic payment data 180 for effecting a funds transfer from a buyer's account into a seller's account. As part of the funds transfer, the funds may be temporarily stored in an effective holding type of account 185, or may be provided by the system 101 before drawn from a buyer's system (e.g., early payment to the seller) with the system 101 collecting funds from the buyer at a later time.

In other embodiments, a buyer or seller may use different payment systems for different types of transactions. For example, a buyer may specify that a payment for a particular transaction be made from a first account and related payment network (e.g., a retailer's transaction card), such that the buyer's account with that retailer is charged. The buyer may then further specify that funds to cover the payment be provided to the first account from a second account, such that the buyer has effectively settled with the first account for the transaction amount, and now carries a balance for the covering funds on the second account. Other uses of different accounts in different manners are similarly carried out for different embodiments, using profiles and/or business rules as appropriate.

The systems and approaches described above and shown in FIG. 1A and in FIG. 1B are amenable to implementation with a variety of different payment networks, point-of-sale acquisition devices and related operational characteristics. Moreover, various embodiments are directed to select aspects of the systems shown in FIG. 1A and/or in FIG. 1B, and can thus be implemented using less than all of the shown components. In some embodiments, a software-programmed circuit arrangement (e.g., 100 or 101) is configured for use in a system that facilitates payment between users of the system, the users including sellers providing goods or services to buyers paying for the goods or services, the payment being provided between disparate, autonomous payment networks of the buyers and sellers. The circuit arrangement includes an input to receive, for a particular transaction, transaction data from at least one of a routing network for a point-of-sale device at which transaction data is input, a buyer payment network and a seller payment network that is disparate from the buyer payment network (e.g., one or more of 112, 113 and 150). The circuit arrangement also includes a control processor to perform one of auditing, fee calculation and fraud monitoring of the transaction for transaction data received from at least one of the disparate payment networks (e.g., one or more of 150, 116).

Payment and settlement between networks, such as those discussed above in connection with FIG. 1A and with FIG. 1B, can be accomplished using a number of different payment and settlement processes. In some embodiments, disparate networks directly communicate with one another where the networks have a bilateral agreement with one other. Transactional data received by each network can be used to reconcile the debits and credits for a transaction by, for example, matching a transaction identifier received by each network. Electronic funds transfer for these approaches can be carried out immediately during transaction processing, or on a periodic basis (e.g., daily). Where the networks directly communicate, they may employ different settlement options depending upon the implementation. The overall system can use network profiles and/or business rules to determine if the networks are compatible, and if so, which settlement rules to implement. In this context a system (e.g., 101) can provide participating networks with data sufficient to allow an appropriate funds transfer for transaction(s) involving each other. Such data may include, for example, an identification of settlement protocols to use, communication methods, or fee calculations. This can be particularly useful for networks that do not have explicit bilateral agreements with one another, but nonetheless, desire to effect electronic funds transfers for payment and/or settlement directly with one another.

In another example, one or more third parties are used to effect settlement. For instance, a financial entity such as a bank can collect from a buyer network while crediting a seller network, and reconciles the collected and credited amounts. This approach can be particularly useful for facilitating transactions between networks that are either incompatible or unwilling to interface directly with one another. In another example, seller and buyer networks may be the same network, thus not requiring interaction to effect payment or settlement.

Each selected network processes transactions according to the network's respectively established protocols. In some cases this includes the billing and reporting functions to the buyer and/or seller participating in transactions. For example, a credit card network can send a statement to the buyer that includes transaction amounts for a periodic cycle, and the buyer is then obligated to repay the proper party within the credit card network. Likewise, the seller could be credited for the value of the transaction through an appropriate network and notified of the transaction details using a transaction statement/report (mailed, online or otherwise).

In a particular embodiment, a portion of one or both systems 100 and 101 is implemented to facilitate population of the system with buyers and/or sellers, who can then transact using one or more accounts related to which the system has access. In some applications, this population approach involves using a database of eligible buyers and/or sellers to identify potential new participants in the system, who are notified of their eligibility using an acceptable mechanism. For example, a purchase placed by a buyer who is a participant in a network associated with the system can be detected and used to contact and invite the buyer to participate.

Once information is obtained, the population system performs one or more of a number of different actions with this information. For instance, the identified buyer can be immediately notified of their eligibility, such as by notifying the buyer or seller of the option before a transaction is completed. In some instances, the buyer is notified of options involving potential savings or other incentives available to the buyer should he or she choose to participate. Such options may involve using one or more preferred accounts associated with a network other than the network that would otherwise be used by the buyer in the instant transaction. In another instances, the buyer is notified after a transaction has taken place, such as through a targeted mailing or email communication. In still other instances, the buyer is notified of options in conjunction with a subsequent statement or bill.

Figure 2:
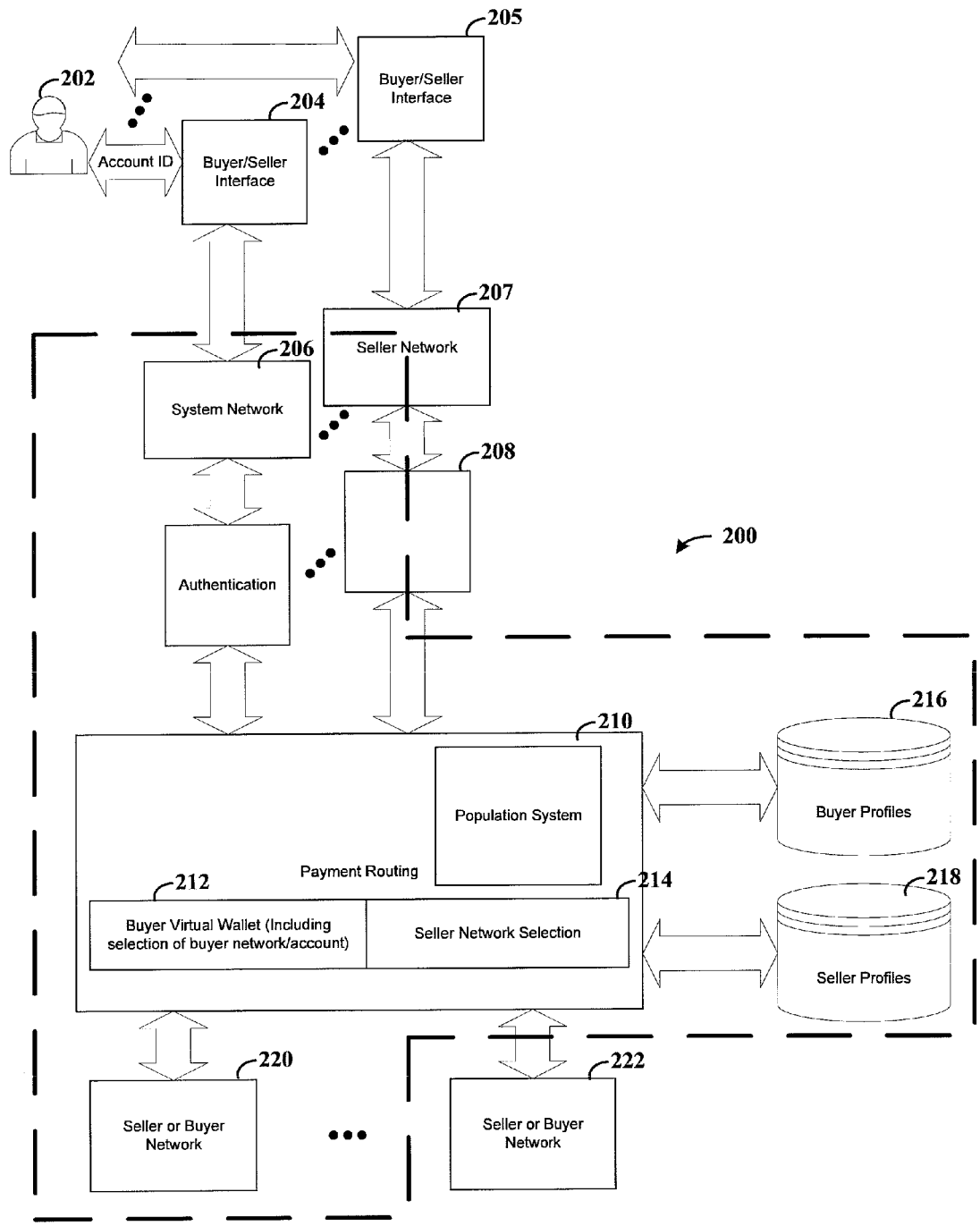
FIG. 2 shows a block diagram for a system, according to another example embodiment of the present disclosure.

FIG. 2 shows a block diagram for a network selection system for selecting and implementing disparate electronic payment networks of different accounts and related networks, according to another example embodiment of the present disclosure. Users of the system, represented by user 202 by way of example, access the system through a buyer seller interface, with interfaces 204 and 205 shown by way of example, respectively connecting to internal network 206 and external network 207.

The network 206 directly connects the buyer/seller interface 204 to the system 200, and may involve an access network that is operated by an entity operating the system 200. For example, the system 200 may be operated by a bank that provides debit card services in addition to (or along with) the disparate payment network functionality. When a buyer uses such a debit card, the system 200 can identify whether or not the buyer is a participant of the disparate network systems and then act accordingly, or otherwise interface with an appropriate card to identify the buyer for effecting payment.

The network 207 connects the buyer/seller interface 205 to the system 200 by way of an external connection, in that network 207 is independently operated (e.g., implements disparate processing and communication functions). In this context, the network 207 may be implemented as a proprietary network such as a network associated with credit cards, debit cards or prepaid cards, and sends data for transactions involving participating sellers to the system 200. The network 207 thus functions to process transactions independent from the system 200 (e.g., by processing a credit card transaction involving a buyer and merchant who are both participants in the specific credit card system).

For either type of connection, transaction authentication 208 can optionally be provided to verify the transaction data. For each of the various participants in the system 200, data for electronic approval and payment of transactions is routed to a selected one of a multitude of payment networks, with payment networks 220 and 222 shown by way of example. The selected network is controlled or otherwise interacted with by the operator of system 200, by one or more different entities, or by a combination thereof. A virtual wallet processor 212 executes the selection of an appropriate account and related payment network for buyers. This virtual wallet approach facilitates buyer access to a number of different accounts held at a number of different payment networks, in essence allowing a buyer to select between different payment options without needing to use the specific identification card (e.g., credit cards and prepaid cards) associated with the selected network.

The virtual wallet processor 212 selects a buyer network using buyer profile data 216, which can include a variety of information relating to the identification and selection of accounts. In some embodiments, the profile data includes a predetermined selection (e.g., made by the buyer) of a buyer network to use, or a set of data upon which account selection may be based (e.g., based upon the type of identification used in the transaction, buyer account status, type of transaction, amount of transaction or data related to the seller).

In other embodiments, the profile data specifies that the buyer be provided options by which a network can be selected. In such an instance, the virtual wallet processor 212 provides these options via one or more of a variety of approaches, ranging from the use of Internet-based access, communication with a seller interface terminal, or mobile device (e.g., phone) communications. For example, the profile data can be used to determine the networks that are available to the buyer and provide that data to the buyer for selection of the appropriate network. This can be done in real time (e.g., using merchant interface) or at a future point in time (e.g., through other communication, such as over the Internet). Available accounts presented for selection to the buyer may be presented together with information regarding the differences between selecting different accounts, such as associated fees, discounts or incentive programs, thereby allowing the buyer to make an informed decision.

A seller network selection processor 214 selects a seller network in a manner that may, for example, be similar to the selection of a buyer network (e.g., using seller profile data 218). In some instances, the seller network is predetermined (e.g., by the seller), and in another instances, the seller network is selected using seller profile criteria, and in other instances is selected in response to input from the seller.

In some embodiments, the system 200 includes a population system 210 that populates the system with active and possible (or approved) participants including buyers who have accounts associated with networks that can be accessed via system 200. The population system 210 uses a database of information regarding potential participants to target those potential participants who have accounts amenable to use with the system 200 and/or are likely to participate. The population system 210 may select an approach to contacting potential participants, such as by direct mailing, email notification, notification on a billing or other statement or a direct telephone call. These and other approaches may be carried out in a manner similar to that discussed above in connection with other population approaches.

Figure 3:
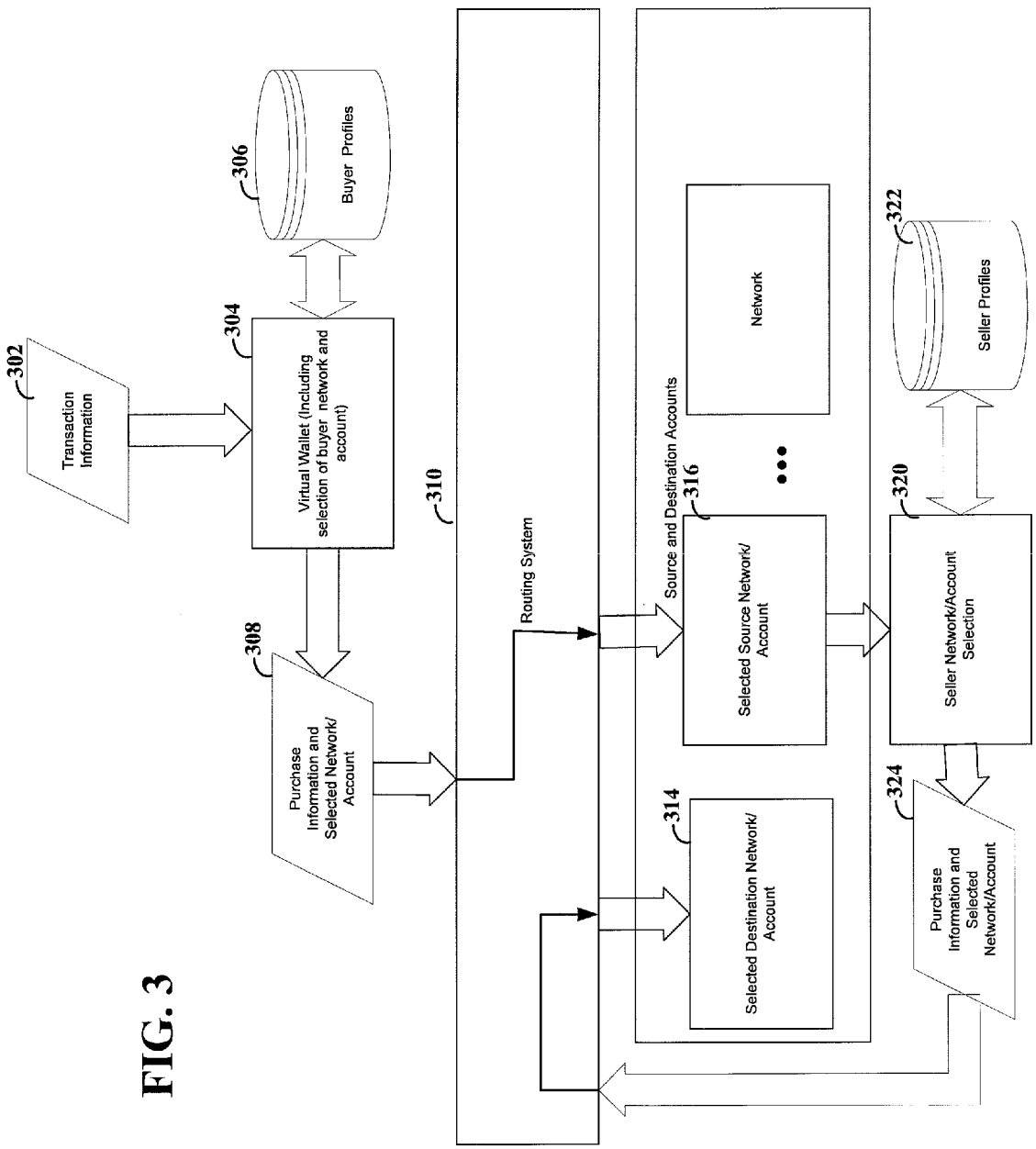
FIG. 3 shows a data flow diagram for network selection, according to an example embodiment of the present disclosure.

FIG. 3 shows a data flow diagram for an approach to electronic payment network selection and interaction, according to another example embodiment of the present disclosure. A virtual-wallet block 304 uses transaction information 302 together with buyer profiles 306 to generate or otherwise provide transaction data 308 including purchase data (e.g., a transaction amount and buyer account number), and information identifying a selected network and/or account information. Generally, the transaction information 302 is received from one or both of a seller and buyer participating in a transaction, such as via merchant-operated point-of-sale devices, and includes data identifying the seller, buyer and the transaction amount.

A routing system 310 receives and effectively routes the data 308 to a selected funding source network/account processing block 316 (or corresponding system), either by simply passing data or by configuring, altering and/or adding to the data 308 in a manner that is amenable to processing with the selected funding source, in accordance with the buyer and/or seller and the particular transaction. The selected network/account processing block 316 processes the routed information accordingly, such as by recording or withdrawing funds against a buyer's account, and by making those funds available to effect payment to the seller.

The transaction information 302 is also used to select a seller network/account system at block 320, with the information 302 received through block 316 and/or from the routing system 310, with one or both of serial and parallel communications approaches. Information such as seller profiles from a database 322 is used together with the transaction information 302 to select an appropriate account, and seller data 324 identifying the selected account and including appropriate transaction information is passed to the routing system 310. For instance, in some embodiments, the seller data 324 includes data for effecting an electronic funds transfer or other approach for providing funds from the source account 316. The routing system 310 passes the seller data 324 to a selected destination network/account 314 processing block (or corresponding system), which carries out appropriate seller functions.

The routing system 310 can thus route transaction data to both source and destination networks, which can overlap. For instance, a buyer and seller can both hold accounts in a proprietary network that processes prepaid transaction cards. For such instances, the selected source network could be the same or different from the selected destination network (e.g., relative to funds transfer), as specified via routing profile information or otherwise). In some embodiments, the routing system 310 includes separate and distinct routing systems respectively implemented for source and destination network routing (i.e., for buyer and seller network routing).

In another embodiment, a third party can collect from the source network while crediting the destination network, thereby executing electronic funds transfer for the transaction between the networks without a direct transfer or communication between the source and destination networks. This approach can be implemented, for example, where two disparate source and destination networks cannot communicate with one another or when such communication is undesirable. The third party effectively interacts with each network relatively independently, and the respective source and destination networks can then handle funds transfer (payment/settlement) with the buyer and seller.

Figure 4:
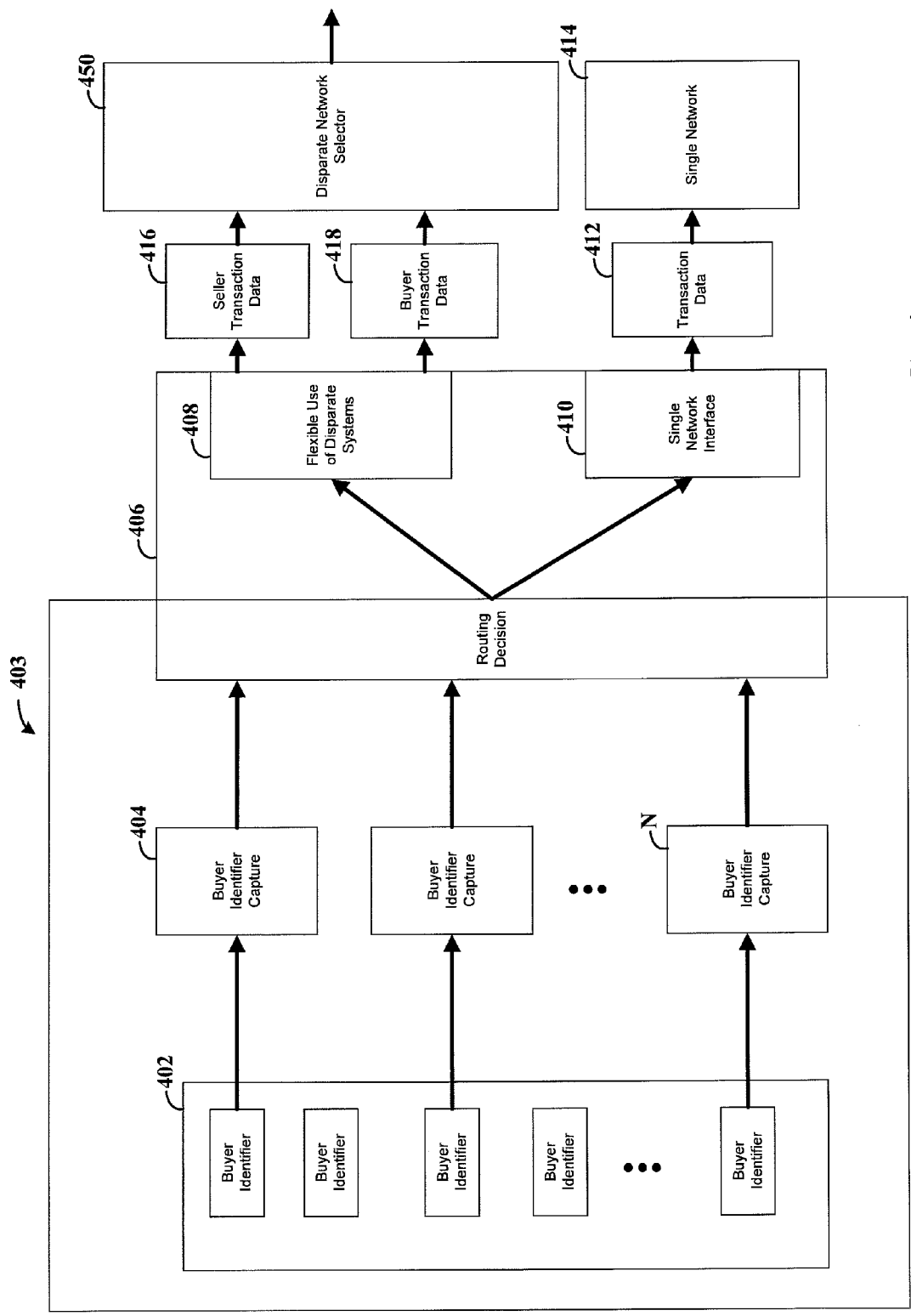
FIG. 4 shows an electronic buyer/seller interface system, according to another example embodiment of the present disclosure.

FIG. 4 shows a buyer/seller interface arrangement 403 for selective routing between disparate systems or a single system, according to another example embodiment of the present disclosure. The arrangement 403 may, for example, be implemented in connection with other embodiments discussed herein and shown in the figures (e.g., as interface 103 in FIG. 1B). The interface arrangement 403 uses a number of buyer identifiers as shown at 402 to identify buyers and, more particularly, their respective accounts. These identifiers (e.g., numbers or other data) may pertain to credit cards, debit cards, prepaid cards, bank accounts, checks, identification cards, radio-frequency identification devices and smart cards, as well as identifiers relating to social security numbers and telephone numbers. Thus, a variety of approaches may be used to identify a particular account for a buyer for a transaction.

Buyer identifiers are captured at blocks 404-N to identify buyers participating in transactions, using one or more of a variety of approaches. One such capture approach involves using a card such as a credit card or an identification card bearing data using a magnetic strip, a circuit chip, a bar code or other approach. Another capture approach involves using an input from a buyer, such as a keyed-in account or an account otherwise made accessible via stored data and buyer authorization to access and use that stored data. These methodologies can be useful for allowing the use of existing seller-buyer interface technology. For example, the buyer can simply present a credit card, or an account number associated with the card, to a merchant that passes the information along for use in capturing an identification of the buyer.

After the buyer identifier is captured at one of blocks 404-N, a routing decision block 406 makes a decision as to how to route, or process, data for a transaction involving the identified buyer, with the data generally including the buyer identifier, the transaction amount and, in some instances, an identification of the seller. For instance, where a single network 414 is used (e.g., where the buyer and seller both participate in a common payment network or a closed network), transaction data 412 is routed to the network using a single network interface 410. This approach is amenable to implementation with a transaction card operating on a proprietary network that is associated with the card, with the transaction data 412 being routed directly to the proprietary network.

Where disparate networks are to be used respectively for the buyer and seller sides of a transaction, the routing decision block 406 routes (408) separate seller (416) and buyer (418) transaction data to a disparate network selector block 450. Appropriate networks are then selected at block 450, respectively for the seller (receiving) and buyer (paying) sides of an electronic funds transfer. Where appropriate, the selector block 450 also produces data appropriate for formatting the transaction data 412, and any corresponding data from each respective system, so that the data is amenable to use at the appropriate networks. In these and other contexts, the selector block 450 may, for example, be implemented in a manner similar to that described with selector 150 above.

In many contexts, the buyer/seller interface system/approach shown in FIG. 4 can be useful for allowing backward compatibility to participants of preexisting networks and at the same time being compatible to participants of the disparate network system. This system/approach can also be useful for allowing participants of the disparate network system to use preexisting buyer identifiers to access the disparate network system.

In a more particular embodiment, the routing decision block 406 is implemented separately for buyer and seller sides of transactions, such that one of the buyer and seller can use the single network 414, while the other uses the disparate network system. In such an embodiment, transaction information can be sent to the single network 414 as well as the disparate network selection block 450 to allow for electronic funds transfer involving both the single network and the network selected at block 450. In one implementation, a third party identifier is sent to the single network 414 to identify a disparate network system used by the other of the seller and buyer. For example, seller-side transaction data may be sent to the single network, while buyer-side transaction data is sent to the disparate network system. A single network credits the buyer's account for the value of the transaction. The credit can be settled by collecting from the third party such as a financial institution. Buyer transaction data is sent to a selected buyer network, which can be disparate from the single network. The selected buyer network debits the appropriate account and provides a credit to the third party.

Another implementation involves sending data identifying a selected disparate network to the single network 414, with the single network 414 in turn using that information in effecting funds transfer. For instance, if seller transaction data is to be sent to the single network 414 (i.e., the seller's account is on the single network), while buyer transaction data is to be sent to a disparate network system, the disparate network system can send the selected buyer network information back to the buyer/seller interface, which in turn sends this information to the single network. The selected buyer network and single, seller network can then perform settlement according to established bilateral agreements, or through the system 403.

According to another embodiment, the routing decision block 406 uses feedback from one or more disparate network systems in selecting one of the systems to use for a particular transaction. In such embodiment, transaction data can be sent to one or more disparate network systems, which applies appropriate user profiles and/or business rules to the transaction data in responding to the interface 403, and the response is used in making a routing decision.

In a particular embodiment, routing decision block 406 is carried out entirely at (and as part of) the buyer/seller interface 403. The routing decision can be made based upon a number of factors, such as the type of buyer identifier used, seller and/or buyer input to the interface, or profile and business rule information for the seller and/or buyer.

Figure 5:
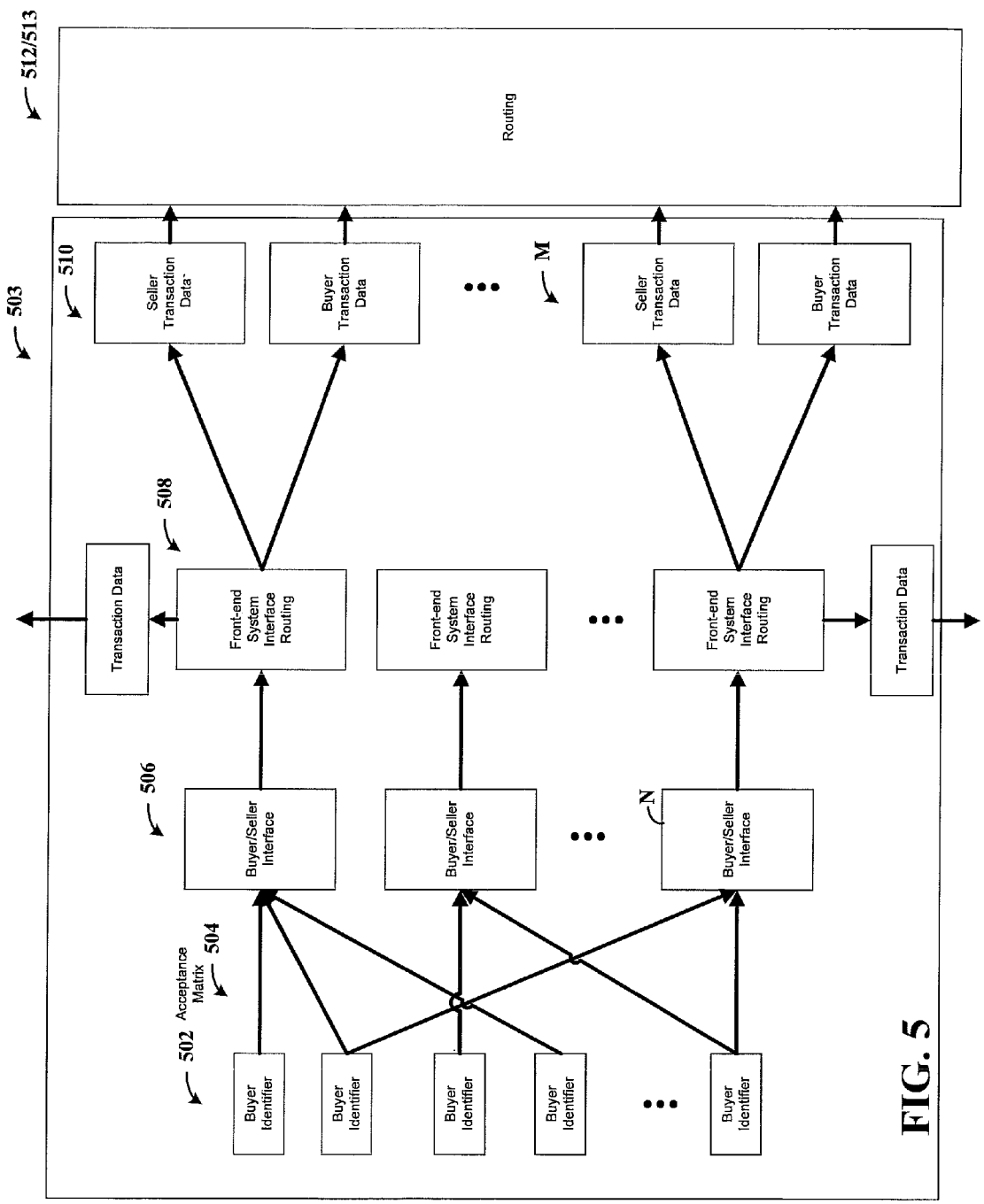
FIG. 5 shows another buyer/seller interface system, according to another example embodiment of the present disclosure.

FIG. 5 shows another buyer/seller interface arrangement 503 according to an example embodiment of the present disclosure. As with arrangement 403 in FIG. 4, arrangement 503 may be implemented in connection with other embodiments, such as those described with interface 103 above. When buyers make purchases, they use buyer identifiers 502 which may include one or more of variety of identifiers, such as those discussed above, carried by a transaction card, chip or otherwise provided. For instance, at least some of these identifiers may correspond to a type of identifier that is issued for use with a particular payment network; for example, VISA® credit cards issued for use with the VISA® payment network or proprietary cards issued for use with a corresponding proprietary payment network. As discussed above, such identifier types allow the buyer to use their identifier in making purchases, while not necessarily requiring that the purchase be made using an account associated with the identifier (i.e., a buyer account identifier can be used to identify a buyer and correspondingly select a different account and related payment network for payment processing).

Buyer/seller interfaces 506-N each accept one or more buyer identifier types as exemplified by acceptance matrix 504, and generate transaction data using the identifier types and related transaction information (e.g., price and seller identification). The interfaces 506 send the generated transaction data to front-end system interfaces 508, which in turn route the transaction data, directly and/or by configuring or processing the data (as shown at blocks 510-M), to one of a plurality of payment processing networks via disparate-network router system 512/513 (e.g., similar to 112/113 above). Routing may accordingly be carried out in a manner similar to that discussed, for example, in connection with FIG. 4 above.

The selection criteria used in selecting buyer and/or seller accounts in accordance with various embodiments discussed above may include a variety of other characteristics. For instance, account selection can factor in the type of buyer identification used, and may be different depending upon whether the buyer uses a credit card, a gift card, a mobile phone or some other identification. The selection criteria can also factor in balances in the buyer's accounts, such as by ensuring that a minimum or maximum (fixed or relative) balance is maintained in a certain account. The selection criteria may also involve ensuring that a certain dollar amount is not exceeded for extended credit. Other selection criteria involve an amount of fees that would be assessed for particular network and transaction options, such that a buyer can avoid accounts for which higher fees may apply, or to otherwise ensure that a transaction is processed as economically as possible. In another instances, account interest rates are used as selection criteria, which can be useful for avoiding the use of accounts having high interest rates. Other criteria relate to the total fees due to financial transactions necessary between selected buyer and seller accounts (e.g., to reduce and/or minimize fees). Still other criteria specify that the use of multiple accounts is undesirable or limited where possible, which can be helpful for simplifying a buyer's billing and payment options.

The selection of a seller network can also be based upon a number of different criteria, including seller profiles and business rules as discussed above, as well as other criteria similar to that discussed above. For instance, rules may specify that a certain account be used under certain conditions relating to such criteria. Example criteria include a transaction amount, transaction type, expected fees, a comparison of the seller's available networks, the type of seller (e.g., Internet seller, department store or utility company) and/or the buyer's information (e.g., the buyer's available networks/accounts, credit rating or account balances). Other criteria is based upon an assumption of risk for the transaction, such as in applications where certain networks underwrite the transaction and thereby assume responsibility for disputes, while other networks pass liability for all disputes directly to the seller. Other criteria relate to the buyer's reliability (or lack thereof). Still other criteria includes information regarding account balances in a particular network, such that a seller having a negative account balance can apply funds received from a buyer to that account (e.g., where the seller uses an account to both make and receive payments). Account consolidation is another type of criteria, which can be implemented to simplify the number of accounts that a particular seller has to monitor and use.

Transaction data is submitted to selected payment networks (e.g., for the authorization or the actual transaction and facilitation of payment) by submitting third party data (e.g., the system implementer) in place of the buyer data, such that the third party is used by the payment network for authorization/approval. Thus, the selected network will receive the funds to be credited to the seller from the third party, which in turn collects settlement from a buyer for the funds credited. In some implementations, information about the buyer's network is submitted and used for authorization/approval as discussed above. In both embodiments, data is appropriately formatted to match the selected seller network.

Settlement for payments using credit extended to a buyer can be implemented in a number of different manners. In some applications, a selected seller network receives payment directly from a buyer's account that is held within the buyer network. The selected seller network and related account provides a statement to seller noting the payment. In another example, a third party (e.g., the implementer of a system such as system 100 or 101) can provide a statement to the seller, with payment processed accordingly. The collection of funds from the buyer can be effected using a bilateral agreement between a buyer network and the selected seller network, or facilitated by a third party (e.g., the system implementer as above), which allows for the networks to establish a suitable settlement option between themselves.

In various embodiments, credit and/or debit functions are delayed to allow for future approval and/or future payment/settlement selection options. For instance, a third party system operator may hold transaction data and/or funds for a period of time before forwarding the transactional data to the selected network. Transactions can be authorized prior to network selection, which is useful, for example, when a buyer is purchasing goods from a merchant. During the delay period of time, participating buyers and sellers can select an appropriate network.

A specific embodiment of the present disclosure is implemented for use with buyers who subscribe to mobile phone services provided by a mobile phone service provider. In some implementations, the buyer uses the mobile phone and/or mobile phone account to effect a transaction, and based upon the buyer's account with the mobile phone service provider, a number of payment and settlement options are provided to the buyer. One settlement option includes charging the buyer's mobile phone account for a purchase, which can be useful for consolidating charges that the buyer makes with the mobile phone services into a single account and resulting bill. The mobile phone account can be selected as discussed above, such that the mobile phone and related account need not be used as an identification source (e.g., a phone user's credit card may be used). Other settlement options include using other accounts for the buyer as discussed above, which can alleviate the need for the buyer to carry additional account information (e.g., he or she simply needs to carry a mobile phone, and does not need to carry credit cards, debit cards or other account information).

Buyer identifiers that can be used with these mobile phone-based approaches include, for example, an external identifier such as a credit card number, or an internal identifier such as the buyer's mobile phone number. Applications involving a mobile phone account can thus be implemented in connection with above approaches, such as those described in connection with FIG. 1A and with FIG. 1B, with the buyer's mobile phone account being a possible selection for transaction processing and/or provision/collection of funds, with the mobile phone number being an example buyer identification.

In some instances, the mobile phone is used to make purchases, such as downloads, Internet purchases for products and/or services, or gasoline and department store purchase, with the mobile phone effectively acting as an interface and/or identification device (e.g., similar to a credit card). In such instances, the mobile phone identifier can be provided automatically by the mobile phone device or inputted manually by the buyer, with automatically provided identifiers implemented, for example, according to an available buyer/seller interface. In one application, an encrypted authorization code is sent to a buyer/seller interface during an Internet purchase. In another implementation, a radio-frequency-identification (RFID) chip is used to send an identifier to the buyer/seller interface during a POS sale.

A variety of authentication procedures can be implemented using a mobile phone-based approach. For instance, a secure code can be entered by a buyer or a secure identifier can be provided by the mobile phone and confirmed by the buyer. Confirmation can be obtained using a message sent and/or received at the mobile phone to confirm that a particular transaction is appropriate. Such a message may involve sending a confirmation text message from the phone, and using that message at a control system (e.g., as in the figures) to authenticate the transaction. Location-based messages or simply data may be used to confirm that the mobile phone is actually located at the point-of-sale.

Figure 6:
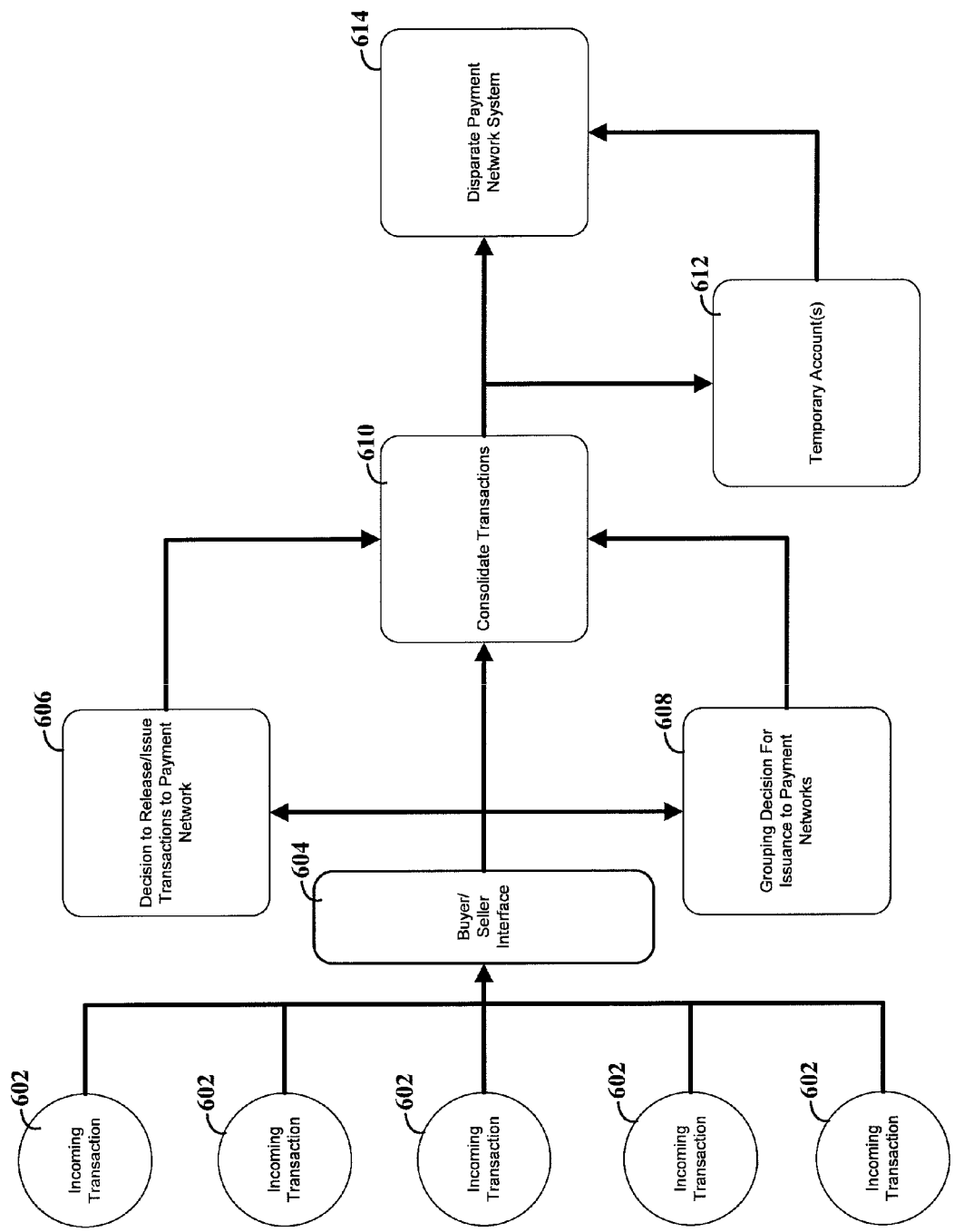
FIG. 6 depicts a flow diagram for processing incoming transactions, consistent with an embodiment of the present disclosure.

FIG. 6 depicts a flow diagram for processing incoming transactions, consistent with an embodiment of the present disclosure. Incoming transactions 602 represent a variety of different monetary transactions that can be received at the buyer/seller interface 604. As discussed herein, the transactions can be POS transactions occurring at a retail location, online transactions and various other transactions. The transactions can include information for identifying particular users. The information can be in the form of identifiers (e.g., numbers or other data) that may pertain to credit cards, debit cards, prepaid cards, bank accounts, checks, identification cards, radio-frequency identification devices and smart cards, as well as identifiers relating to social security numbers and telephone numbers. The transactions can be received from multiple different purchasers and/or sellers or retailers.

Block 610 represents the consolidation and/or grouping of multiple transactions. This consolidation of transactions can be particularly useful in combination with the use of the disparate network system 614 discussed herein. For instance, decision blocks 606 and 608 represent two decisions that can be used in connection with the consolidation of the transactions. Block 606 represents a decision of when to release transactions and/or to issue them into the disparate payment network system 614. Block 608 represents a decision of how to group transactions so that they can be processed together. A few, non-limiting, embodiments are discussed in more detail hereafter.

In one such embodiment, a number of transactions can be consolidated over a period of time before being entered in the payment system. For instance, transactions of small amounts can be consolidated and entered into the payment network as a single, larger transaction. This can be particularly useful for applications in which there is a per-transaction fee. Without such consolidation, the fees can be disproportionate to the transaction amounts. For instance, retailers/sellers can be charged a per transaction fee for each credit card use by a buyer. Aspects of the present disclosure allow for multiple transactions to be consolidated into a single transaction. For instance, a buyer may purchase several items from the same retailer over the course of a day, week or some other period of time. Rather than process each purchase as an individual transaction, the transactions can be consolidated and entered as a single transaction. For instance, a restaurant or other retail store may have customers that use their credit card for several transactions (e.g., returning customers, customers splitting bills using many credit cards or other multiple individual credit card transactions). The retailer can process the transactions individually, while the transaction processing system consolidates the transactions and thereby saves on per-transactions based fees. In this manner, neither the retailer nor the customer is inconvenienced. In another instance, an online retailer, such as a provider of online multimedia (e.g., downloadable movies of music), may have customers that make many small purchases. The retailer can process each transaction individually, while allowing the system to consolidate the transactions.

In another embodiment, the determination for whether and/or how to consolidate transactions is based upon the fee structure for one or more of the payment networks. The fee structure is used to determine whether a transaction should be delayed for consolidation before being issued to a payment network. The amount of such fees can be calculated and used to assess the most efficient and cost effective solution.

Consistent with a particular embodiment, the transaction processing system can delay introduction of a transaction into a selected payment network if an overdraft is detected. The participant can then be presented with an opportunity to provide funds to cover the overdraft. This decision can be made, in part, based upon the potential overdraft fees that are associated with the selected payment network. After a set period of time, or some other criterion, the transaction can be presented to the selected payment network.

Transactions that are not immediately issued to a payment network can be held in one or more (temporary) account(s) 612. This account 612 can be a master account for all buyers/sellers, or a set of individual accounts for each buyer/seller. Each buyer can have a set limit for funds outstanding in the account 612, after which transactions are issued to payment networks. For instance, a buyer that participates in the disparate network system can have an established credit limit of $500 in the account 612. Transactions can be stored in the account 612 to allow for these transactions to be consolidated and issued as one or more consolidated transactions. If, however, the outstanding amount of the transactions reaches $500 for the buyer, transactions can be issued to the disparate payment network system thereby keeping the outstanding amount in account 612 below a credit limit. The account 612 could also be a funds-bearing account instead of (or in addition to) a credit-based account. In this manner, the transactions can be funded from the funds-bearing account 612. When the transactions are issued to a payment network, the funds-bearing account 612 can be credited for the transaction amount.

Account 612 could have interest rates associated therewith and the determination of whether or not to consolidate transactions could take these interest rates into account (e.g., by balancing the interest rate against the transaction fees). In certain embodiments, fee savings, e.g., from consolidation of transactions, can be passed directly on to the buyer and/or seller. In other embodiments, the fee savings can be used to fund rewards-based programs. For instance, the fees that would have been assessed without the consolidation can still be charged to the seller or buyer, however, since the fees were effectively reduced by the consolidation, the operator of the consolidation system can pass on some (or all) of the fee savings in the form of incentives or rewards.

Consistent with other embodiments of the present disclosure, the transaction grouping decision 608 can group transactions according to the eligibility of the transactions for rewards or incentives. Many accounts, such as credit cards or bank accounts, have incentive programs that encourage account holders to use the account, increase amount of savings or the like. Group decision block 608 can group transactions according to their eligibility for one or more of such incentive programs. Some incentive/rewards programs exclude certain types of transactions. For example, some credit card programs exclude large-ticket items (e.g., tuition, vehicle, rent or other large payments) from rewards points. Other transactions types are restricted from certain payment networks (e.g., department store cards that restrict transactions made at non-participating stores). Accordingly, the transactions can be grouped according to their eligibility.

In a particular embodiment, a buyer can specify one or more goals, which can be used as a further parameter for grouping transactions. As an example, a buyer may specify that they wish to accumulate enough rewards points to obtain a particular reward. Transactions can be grouped to reach this goal quickly and, once a first goal reached, to reach a second goal.

According to another embodiment of the present disclosure, the transactions can be grouped according to redemption options available to the buyer in the transaction. For example, the transaction may specify that the buyer initiated the transaction using a particular device (e.g., smart phone, laptop or home computer). This may indicate that the buyer would appreciate and/or be able to use rewards specifically tailored toward the particular device (e.g., applications for a smart phone or downloadable music for a music-enabled device). In certain embodiments, the grouping/consolidation of transactions can occur for transactions other than those initiated using the particular device. For instance, if the system has knowledge of the buyer's access to a particular device, subsequent transactions can be grouped based upon this knowledge. In various implementations, a list of devices can be maintained for each buyer and the transactions can be grouped accordingly.

In another embodiment, the grouping of transactions can be implemented according to a buyer's involvement with one or more online social networking services. For instance, a buyer may have a credit card account that is linked to a social networking service, such as Facebook™. This knowledge can be used to group transactions for issuance. Moreover, many social networking sites have large amounts of information (e.g., demographic data) about their participants. A buyer can opt to share this information with the transaction processing system, which can then use the information to group or otherwise process the transactions.

Figure 7:
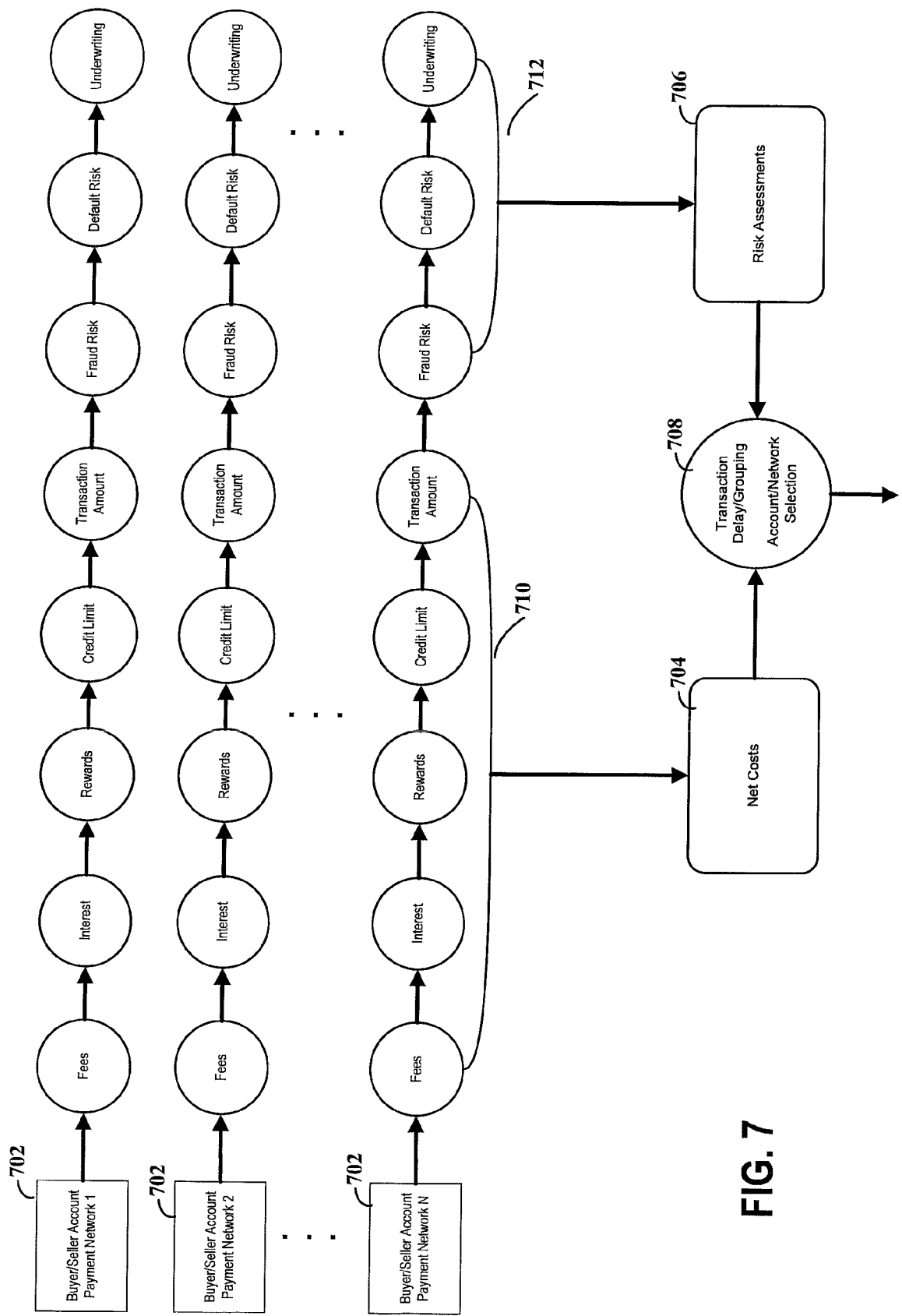
FIG. 7 depicts a flow diagram with various factors involved in the processing of transactions, consistent with an embodiment of the present disclosure.

FIG. 7 depicts a flow diagram with various factors involved in processing of transactions, consistent with an embodiment of the present disclosure. The flow diagram shows various buyer accounts and associated payment networks 702. Example attributes of these systems are broken down into two categories 710 and 712. Relative to a particular transaction, these categories relate to algorithms for calculating of a net cost of the systems 704 and to risks associated therewith 706. These calculations can then be used to make decisions regarding transaction grouping, transaction consolidation and/or selection of payment networks (708).

Consistent with one embodiment of the present disclosure, a transaction is evaluated using factors, such as fees, interest, rewards, credit limit, and/or transaction amount. For instance, a transaction between a buyer and a seller can be submitted into the transaction processing system. The transaction processing system can then assess the net cost for use of each account or disparate payment network 702. The net cost can be the cost to the buyer, to the seller, to the operator of the transaction processing system or combinations thereof.

In one implementation, the net cost is calculated for the buyer. The buyer may have multiple credit card accounts, one or more savings accounts and a department store card. Each account and/or payment network option can be assessed in terms of various factors. One factor includes transaction fees. Some accounts charge fees for too many transactions, too few transactions, for overdrafts or for other actions.

Another factor is the interest rates, whether interest incurred for credit taken out or interest lost because of money taken out of savings (or similar) accounts. For instance, if the information is available, the system can assess whether or not a credit card balance has been kept current and thereby is not incurring monthly interest charges.

Another factor includes incentives or rewards offered by one or more of the accounts or payment networks. In one embodiment of the present disclosure, the algorithm for calculating net cost can assign a (pseudo) monetary value to the rewards program based upon the rewards offered. For instance, the rewards program may be a cash-back program, for which the system can correlate the cash back amount for the transaction. In another instance, the rewards program may offer non-monetary incentives, such as airline miles/points or rewards points that can be redeemed for a variety of products and services. Such points can be assigned a relative monetary value (e.g., 100 reward points are equivalent to one dollar). The assigned value can be assigned by the transaction processing system, by the individual users or by others.

Other factors include the credit limit and the account balance(s). These two items are often closely related as the account balance is often directly linked with the current amount of available credit. Moreover, some credit lines are linked to account balances of other accounts (e.g., a secured credit card or a credit line linked to a savings account).

Various ones of these and other factors may relate to one another. For example, the account balance may determine the interest rate of a savings account or whether certain fees are waived. Thus, the system can calculate lost interest or fees according to the account balances.

Similar assessments can be carried out for other parties involved in the transaction. In a particular embodiment, for example, the transaction processing system attempts to determine the most efficient solution for multiple parties (e.g., a solution for which the least costs are incurred for the involved parties).

In certain embodiments, the transaction processing system performs a risk assessment 706 for the various transactions. The risk can be, for example, for the party that underwrites the transaction. An underwriting party assumes risks associated with the transaction, such as the transaction being invalidated due to fraud or buyer default. For example, the underwriting party may extend a line of credit to the buyer and pay the seller. If the buyer defaults or there is an allegation of fraud, the underwriting party may suffer a financial lose for the transaction.

In another embodiment, the risk is evaluated for the buyer and/or the seller. For instance, a buyer may have better fraud detection and/or protection when using certain payment networks or accounts. As an example, certain accounts/payment networks may provide fraud protection for a buyer. This can include automatic reimbursement for any fraudulent charges, notifications of possible fraud, account freezes and other actions. Accordingly, the transaction processing system can identify transactions with a high fraud potential and issue the identified transactions to an account/payment network with better protection against fraud.

In another instance, the transaction processing system determines the fraud/default risk relative to the seller's interest and selects an account/payment network accordingly. As an example, a seller may provide a credit line that the buyer can use for purchases; however, if the transaction is particularly high-risk, the transaction processing system can be configured to select a third party that also provides a credit line to the buyer. This allows the seller to mitigate the risk of offering credit to customers. For example, department stores, gas stations and the like offer credit lines/cards to their customers. A customer may pass initial credit checks and be offered a credit line with the seller. A subsequent change to the customer's status can result in the seller's denial of further credit to the customer. Rather than denying the use of the credit line and requiring the buyer to manually find another payment solution, the transaction processing system can seamlessly select another payment option for which the customer is eligible. Often, the selected payment option is for an account/credit line that has been designed for a higher-level of risk. Thus, the transaction processing system can provide a solution that is efficient and satisfactory for all parties.

In certain embodiments, the transaction processing system employs an algorithm that uses both the net costs and the risk assessment in the processing of the transactions. For instance, the net costs calculations can be adjusted as a function of the risk assessment and the relative protection for the risk provided by each account/payment network. As a non-limiting example, if the risk of default or fraud is five percent then the net cost can be adjusted up five percent for the party (or parties) that would incur the cost of the default or fraud. The transaction processing system further adjusts the net cost according to the success level of each account in terms of protection and/or recovery of funds that are fraudulent or defaulted upon.

Embodiments of the present disclosure provide the users of the transaction processing system with options for adjusting the algorithm used to select how the transactions are processed. At a general level, the transaction processing system can provide the parties with the ability to adjust whether lower cost or lower risk is of more importance. This is because the two goals can often be competing goals, e.g., because higher protection levels are often associated with higher fees. Thus, risk-adverse parties can set their risk avoidance high, presumably with a possible additional cost in fees, interest or the like. Cost conscience individuals can likewise choose the lowest fee options while not being as concerned about the risks. This can be particularly useful for individuals that do not expose themselves to high-risk transactions (e.g., due to low usage or low value transactions amounts). The transaction processing system can also allow parties to specify parameters for categorizing transactions. For instance, the parties can specify that the importance of risk is commensurate with the transaction value, the type of goods or service being purchased, the method of purchase (e.g., online vs. in store) or other factors.

In a particular embodiment, the transaction processing system proactively offers the participating parties with options for opening new accounts in response to the various factors. For instance, the transaction processing system can perform the calculations for accounts/payment networks at which the parties already hold accounts. The transaction processing system can compare the calculations of the party's current accounts to potential accounts. If one of the potential accounts produces a favorable calculation result, the transaction processing system can provide this information to the party as part of an offer to activate an account therewith. This allows for the system to match parties with accounts that suit their particular needs.

Figure 8:
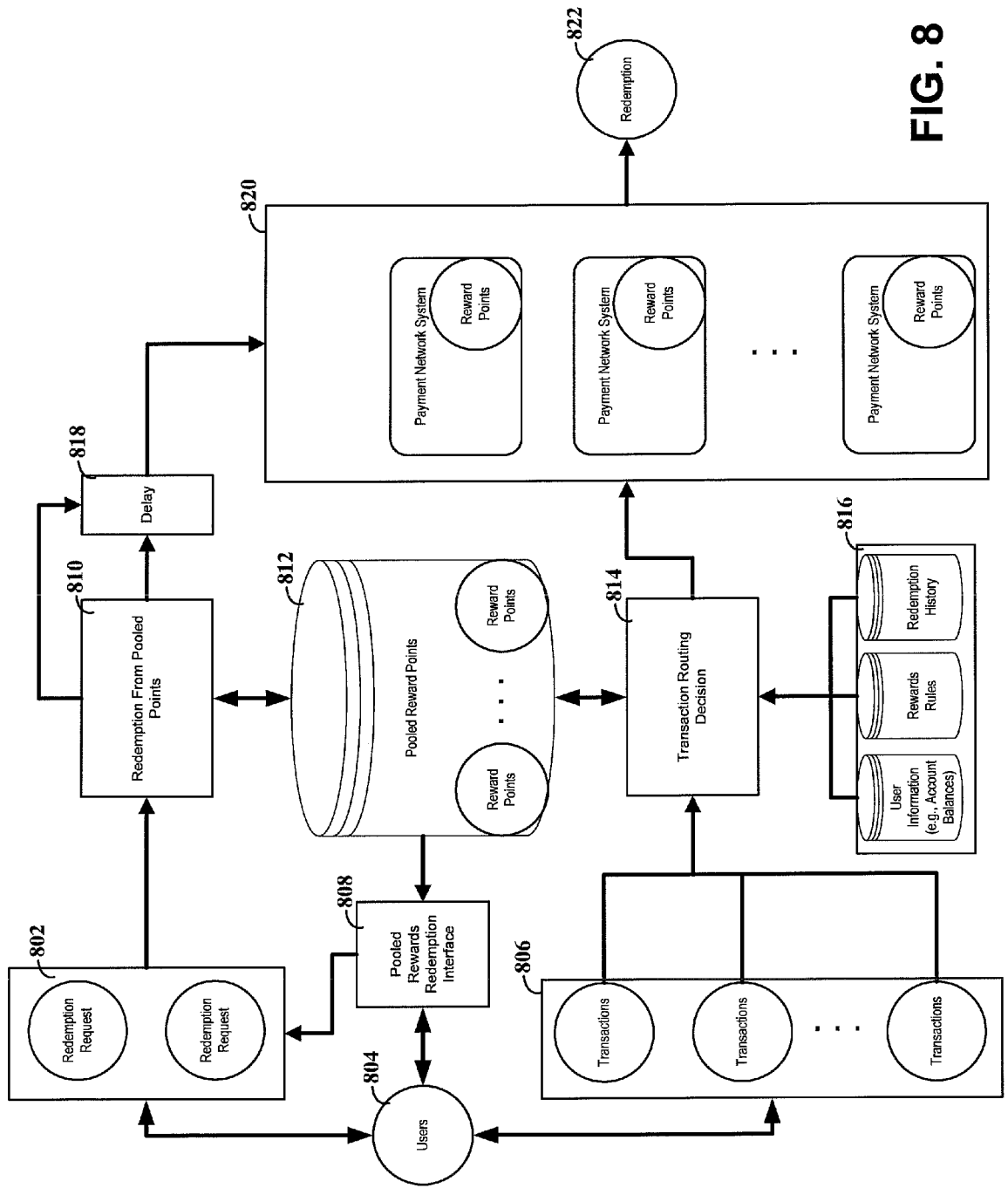
FIG. 8 depicts a flow diagram for a transaction processing system designed to handle transactions involving incentive/rewards programs, consistent with an embodiment of the present disclosure.

FIG. 8 depicts a flow diagram for a transaction processing system designed to handle transactions involving incentive/rewards programs, consistent with an embodiment of the present disclosure. Users of the system 804 hold various accounts commensurate with various payment network systems 820. These payment network systems 820 can offer rewards or incentives to encourage certain behaviors by users 804. As a non-limiting example, a payment network system can provide rewards based upon a dollar value of transactions issued to the payment network system.

Consistent with one embodiment of the present disclosure, the transaction processing system receives transactions 806 from users 804. The transaction processing system makes a routing decision 814 for the transactions 806. The routing decision 814 includes a determination of rewards that are available in connection with the various payment network systems 820. The transaction processing system can access a variety of databases and parameters 816 as part of the routing determination.

Consistent with one embodiment, the transaction processing system makes a determination using an algorithm that identifies the payment network system that provides the most advantageous incentives. For example, the transaction processing system can attribute a value to the redemption options/rewards 822 offered to users 804. Such a valuation of the rewards 822 can be relatively straight forward (e.g., for cash-back programs or prepaid credit cards) or can involve a more complicated/subjective valuation (e.g., for airline miles and for various goods or services). To assist in the valuation, the transaction processing system can be configured to allow for participants of the rewards programs to rate the different programs or the rewards provided thereby. This rating can then be used as part of the valuation.

Consistent with another embodiment of the present disclosure, the transaction processing system allows individual users to customize the rewards program valuation algorithm. For instance, a user can indicate that airline miles are preferred over other rewards. In other instances, a user can specify certain goals relative to the rewards points. For instance, a user can identify a particular reward, such as an electronic device, and the system will allocate/route transactions to achieve the reward. Absent the user input/direction in this regard, the transaction processing system can use the global valuation algorithm (such as the algorithm discussed in the preceding paragraph) as the default for selecting a rewards program. The various goals can also indicate that a redemption value can be sent to specific account types based upon such factors (e.g., deposit cash back rewards into an investment account if a current credit to debit balance is below a threshold).

In many instances, however, a user may not know what they wish to redeem their rewards points for until after they have already accumulated many points. Accordingly, embodiments of the transaction processing system have an optional feature that allows for pooling of rewards points. A user that has more than one account that offers rewards points will usually have to choose which program a transaction will be credited towards at the time of purchase (e.g., by using a particular card). The pooled-points option, however, facilitates the ability of a user to delay such a selection until a later time.

Consistent with one embodiment, the transaction processing system receives transactions 806 from many different users 804 and the transaction routing decision 814 is made such that the transactions are sent to various different payment network systems 820. Collectively, the rewards points of the many users 804 accumulate in various different programs. The total rewards points for each program is stored as a pooled reward-points database 812. Also stored is a respective rewards value for each user. The respective rewards value is consistent with the transactions 806 for each user; however, the user is not necessarily limited to redeeming points corresponding to how their own transactions were processed. Instead, users 804 can view their respective reward points and also a variety of different redemption options through a pooled rewards redemption interface 808. Through this interface 808, or another interface, the users 804 can enter redemption requests 802 based upon the amount of their respective rewards value.

Consistent with various embodiments of the present disclosure, the transaction processing system provides users 804 with the option to redeem their respective rewards value relatively independently from actual reward points of the specific user. For instance, one-hundred users could each be participants in three different rewards programs. The transaction processing system can route transactions for these users so that, collectively, there are reward points accumulated in each of the three programs. While none of a particular user's transactions may have been routed to a first one of the programs, the particular user can still redeem 810 a respective reward value for the first program by drawing on reward points accumulated from other transactions of other users.

In certain embodiments of the present disclosure, the transaction processing system provides a feedback mechanism to track redemption by users and to compensate for the tracked redemptions by changing the transaction routing decision 814. For instance, if redemption requests are disproportionate relative to how the transaction processing system originally allocated the transactions, the transaction processing system can adjust the allocation of future transactions to compensate. For instance, the transaction processing system might start by allocating the transactions evenly between all available reward programs. Over the course of several months, the users may submit redemption requests in an uneven manner that suggests that one or more of the rewards programs has a higher demand from the users. The transaction processing system can thereby adjust future transaction allocations to increase the percentage of transactions for the high-demand programs. For example, assuming there are five rewards programs, the transaction processing system can begin with a distribution that submits 20% of the transaction values to each rewards program. After some period of time, participants begin redeeming rewards at rates of 50%, 20%, 10%, 10% and 10% for each of the five rewards programs. The transaction processing system recognizes the disparity between the redemption rates and the current transaction submission rate and makes adjustments that result in the pooled rewards points having a similar distribution to that of the redemption rates.

In an optional embodiment, the transaction processing system can implement a delay 818 for redemption requests as necessary. This delay can be particularly useful for situations in which users 804 present an unexpectedly high number of redemption requests 802 for a particular reward program. This can result in the redemption requests 802 exceeding the currently accumulated points for that particular reward program within the pooled reward points 812. In response to such an event, the transaction processing system delays one or more redemption requests. The transaction processing system can also adjust the transaction routing decision to route incoming transactions such that reward points are quickly built up for the particular reward program. Once sufficient reward points are accumulated the delayed redemption requests can be issued. Given a large enough pool of users and associated transactions, short-term shortages can be quickly compensated for.

An embodiment of the present disclosure relates to the interaction between the transaction processing system and the various payment network systems. To facilitate the pooling of rewards points, the transaction processing system can establish a pooled account at each of the participating payment network systems. In this manner, the reward points for each participating payment network system are conveniently accessible to the payment network system via a single account. Whenever the payment network system enters a transaction for a user, the rewards points can be credited to the pooled account. The payment network system then issues redemption requests using the pooled points. The redemption request also identifies the intended recipient of the redeemed reward so that the proper individual receives the reward.

Implementing the pooled rewards account can be facilitated by having agreements with the payment network systems that allow for the rewards to be redeemed by any participating user irrespective of their individual rewards points with the particular payment network system. For instance, a participant might have 5,000 pooled rewards points, but only 1,000 points were actually redeemed at a particular payment network system. Assuming that the pooled points (i.e., between many different participants) exceeds the redemption request, the particular participant is not necessarily limited to only 1,000 rewards points at the particular payment network system. The payment network systems are encouraged to allow this type of pooling because it provides an added value to participants. Thus, participants may perceive payment network systems that do not allow the pooling as being less desirable.

In certain embodiments of the present disclosure, the transaction processing system can show the potential of various payment network systems to participants. For example, a participant can be shown the possible redemption rewards for payment network systems that they do not yet hold an account. In this manner, network payment systems can increase their participant rate by increasing exposure to their respective rewards users and thereby garner more transactions. Other incentives include the transaction processing system's ability to suggest new accounts for users (e.g., based upon calculated potential savings), thereby, providing targeted promotions for the payment network systems.

Consistent with various embodiments of the present disclosure, the calculation of rewards points can be implemented based upon factors other than a transaction amount. For example, the calculation of rewards points can be implemented as a function of the existence of an account, values or changes in the monetary value within an account, the existence of multiple accounts, duration that an account or balance has existed, transfers of balances from other accounts and/or the elimination (or reduction of value) of other accounts.

Embodiments of the present disclosure are directed towards the use of rewards programs in connection with non-financial accounts and other types of relationships (e.g., online Social Networks). A particular embodiment relates to offering rewards that are targeted towards Facebook™, MySpace™ or similar applications (e.g., tied to online competitions/games/privileges). These rewards can be redeemed in the form of competitive game perks associated with these applications. These rewards can also be pooled and redeemed for different applications/websites/competitions or games. Such embodiments can be particularly useful for providing competition-based feedback to encourage users. For instance, users can be provided with input regarding their stature relative to others (e.g., savings-to-credit position relative to all U.S. participants) to encourage desirable behavior. The transaction processing system can also provide the option for Social Network groups to accumulate rewards for a specific cause/group (e.g., charity groups to which rewards are donated).

Social networks and other online services often have access to significant information about individuals. This information can be used to provide customized rewards options. For instance, iPling™ or foursquare provide location information about individuals. The transaction processing system can determine what rewards are most appropriate from such information. For instance, participating retailers can offer rewards for loyal customers. This can be done automatically by the transaction processing system, which can be easier and more effective than the retailer keeping track of such information (e.g., using a store card).

In certain embodiments, the transaction processing system is designed to operate with smart phones and similar mobile devices. The transaction processing system can receive transaction data from the mobile device as discussed herein. Moreover, mobile devices can provide information, such as location information from a global-positioning-system (GPS). This information can be used to select a payment network and/or provide targeted rewards/incentives to users of the mobile devices. This can be particularly useful for providing instant rewards that are provided to a user based upon their current location (e.g., discount on ski gear for a user located at/near ski resorts or a discount for a restaurant that is near the user's location).

In certain implementations, the rewards can be targeted towards the type of mobile device. For instance, the transaction processing system can select rewards that are consistent with the smart phone capabilities. This can include, for example, downloadable applications, music, videos and the like. The transaction processing system can also maintain a list of devices enabled/used by each user. Rewards can then be targeted toward the devices listed. A user may, for example, have a smart phone, a portable MP3 player, a tablet computer and a home gaming system. Each of these devices can be linked to purchasable items and payment networks. Accordingly, the transaction processing system can automatically build a list of devices for the users as they are used as part of a transaction. The users can also proactively register their devices. The transaction processing system can then provide rewards tailored towards these devices. The transaction processing system can delay the issuance of the reward until a particular device associated with reward is used. For example, user makes purchase on a smart phone and earns a reward associated with a registered tablet computer. The earned reward is displayed to the user once their table computer is turned on and able to communicate with the transaction processing system (e.g., once connected to the Internet).

Consistent with one embodiment, the transaction processing system uses an algorithm to identify multimedia rewards that are consistent with a particular user's preferences and/or past purchase history. For instance, the transaction processing system identifies MP3 music files for artists and songs that are identified as being consistent with the user's current music selection and provides these files as a reward.

Other embodiments of the present disclosure relate to the use of rewards points to protect participants against overdraft fees. For example, if the transaction processing system detects that a transaction will trigger an overdraft fee and the participant has sufficient rewards points to cover the overdraft fee (e.g., with a cash-back redemption option), the transaction processing system can automatically redeem the points to cover the transaction. This added protection can be used in conjunction with various other overdraft protection options including, but not limited, delayed transaction processing and transfers from other accounts.

Figure 9:
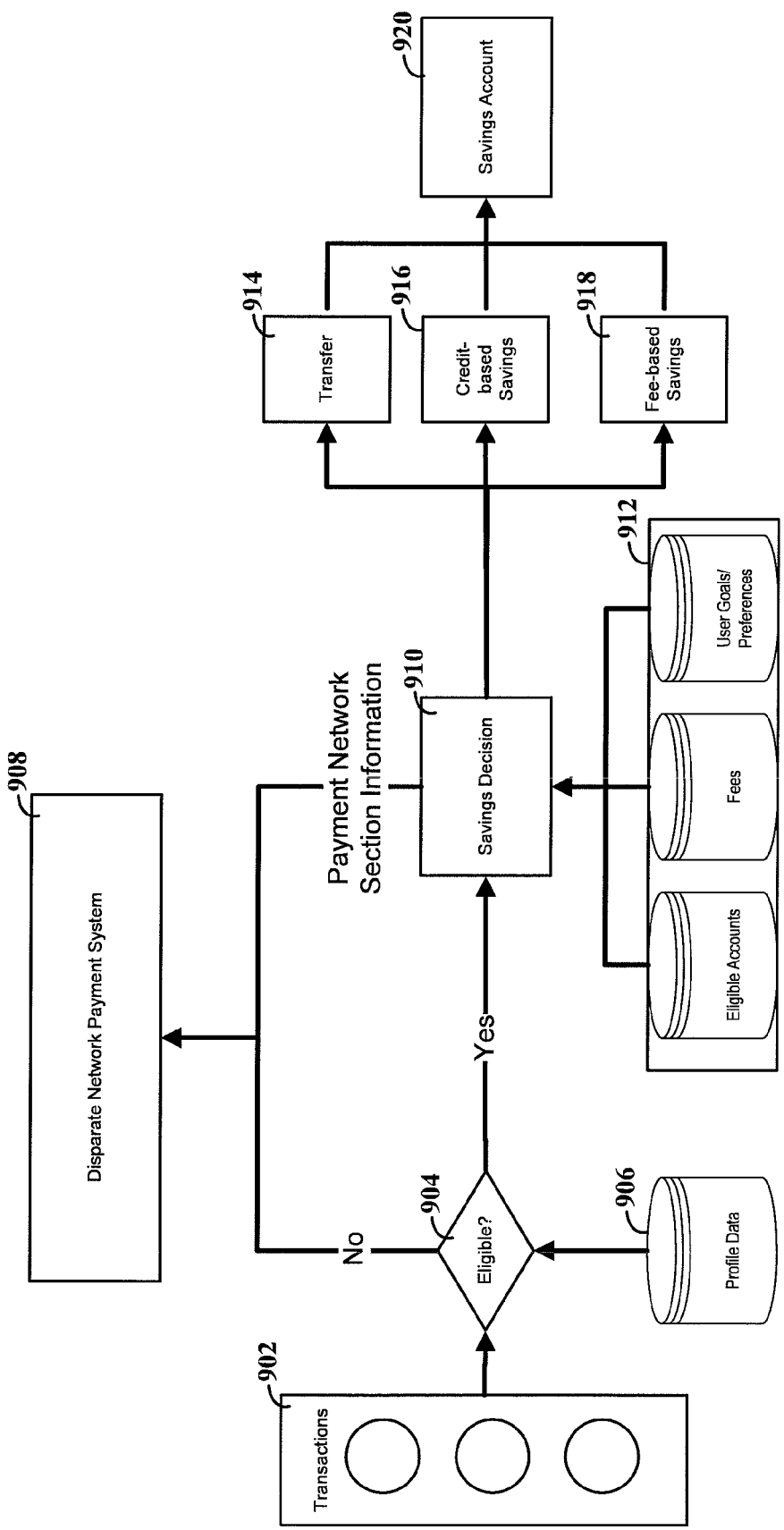
FIG. 9 depicts a flow diagram for a transaction processing system that provides savings-related features, consistent with an embodiment of the present disclosure.

FIG. 9 depicts a flow diagram for a transaction processing system that provides savings-related features, consistent with an embodiment of the present disclosure. Upon entering the transaction processing system, the transactions 902 are checked for eligibility 904 relative to various savings-related functions. The transactions 902 can originate from a variety of different sources depending upon the various embodiments of the transaction processing system. In one such embodiment, the transactions 902 can originate from a POS device, such as a credit or debit card purchase. Other possibilities include, but are not limited to, ACH transfers, automated bill-payments, direct (paycheck) deposits or deposits made at a branch location or ATM.

The eligibility determination 904 can be made as a function of profile data 906, which can be stored in one or more databases. The customer profile data includes a profile for each customer that is enrolled in a savings program.

The customer profile for each customer can include various types of information, such as an account number that identifies the customer's account for accumulating savings. When a customer enrolls in the savings program, the customer designates one or more accounts for participation in the savings program. The customer also selects the type of transactions for each of the selected accounts that will trigger participation in the savings program. For example, a customer can indicate that debit card purchases, ATM withdrawals, checks and online bill pay transactions associated with a particular checking account will trigger participation in the savings program, and that ATM withdrawals and deposits, associated with a particular savings account, will trigger participation in the savings program. This, and other, information can be stored as part of the profile data. The eligibility decision 904 can therefor be made based upon any of a number of different factors, many of which can be selected by the customer.

Consistent with a particular embodiment of the present disclosure, the disparate payment network system 908 provides the flexibility to allow transactions to be selectively applied to a specific account. For example, a user with one or more eligible accounts may initiate a transaction with a credit/debit card linked to an account that is not eligible. Using the disparate payment network system 908, the transaction can be routed to an eligible account. Accordingly, in addition to determining whether or not a particular transaction is eligible the transaction processing system can perform a savings decision 910. This savings decision 910 can be made based upon various data sources 912. For example, data 912 can include the various eligible accounts, potential fees of the eligible (and non-eligible) accounts and user/customer specific goals or preferences. The savings decision 910 can include an indication of a specific eligible account, which can then be passed onto the disparate network payment system 908 to direct the processing of the transaction. The savings decision 910 can also include whether the savings program provides a transfer of funds 914 from another account, credit based savings 916 and/or fee based savings 918 as discussed in more detail hereafter.

In some embodiments, the savings decision 910 can provide for a transfer of funds 914. The source of the funds can be the savings achieved through the use of embodiments of the transaction processing system discussed herein. For instance, the savings could be fee savings 918 (e.g., due to consolidation of transactions) or credit/interested savings 916. Instead of modifying the transaction amount to account for the savings, the transaction amount can be processed as if the savings had not been achieved. The savings are then placed into a designated (savings) account 920.

The transaction processing system can provide the customer with selection options for a particular savings algorithm. The transaction processing system can then use the selected savings algorithm to determine the amount that is transferred/deposited into the customer's accumulated savings account when the customer engages in an eligible transaction. For example, a customer can select an algorithm that causes 2% of the amount of every debit card purchase to be transferred to the customer's accumulated savings account. In one implementation, the customer can select a different saving algorithm for each of the selected types of transactions for each of the selected accounts. The customer could also select a single savings algorithm (e.g., 1% of the transaction amount) for each of the selected types of transactions for each of the selected accounts. In a further implementation, the transaction processing system can assign a default saving algorithm (e.g., 1% of the transaction amount) to each of the selected types of transactions for each of the selected accounts for which the customer does not select a savings algorithm.

The circuit-implemented system can include one or more of: non-transitory storage medium storing instructions for execution, discrete logic circuitry, programmable logic arrays, specialized processors or general purpose processor that is specifically programmed. Combinations of these and other circuit elements are also possible and within the scope of various embodiments of the present disclosure. For example, systems consistent with the aspects discussed herein can be implemented in a variety of circuit-based forms, such as through the use of data processing circuits. More specifically, such systems are exemplified by implementation in high-speed programmable computer/processor circuits that execute instructions, which can be stored on a non-transitory storage medium, to provide operations corresponding to the various blocks of the figures. Alternatively, such a computer/processor could be implemented in combination with discrete and or semi-programmable circuitry, (e.g., as Field-Programmable Gate Arrays, Programmable Logic Devices/Arrays). Also various ones of the illustrated blocks, and those functions discussed in text, can be implemented using integrated and nonintegrated approaches, e.g., with certain of the blocks located remotely and/or operated disparately relative to the other blocks.

The various embodiments described above are provided by way of illustration only and should not be construed to limit the disclosure. Based on the above discussion and illustrations, those skilled in the art will readily recognize that various modifications and changes may be made to the present disclosure without strictly following the exemplary embodiments and applications illustrated and described herein. For instance, such changes may include the implementation of various components by different entities that may or may not operate at arms length from one another. Other embodiments and implementations are directed to the combination of approaches described herein with the figures and/or otherwise, as well as those described in the above-referenced provisional application and in the claims. In addition, various embodiments are directed to a processor that executes code to carry out the steps and/or functions as described above, in connection with the figures or otherwise. A corresponding embodiment is directed to a computer system that communicates with a remote seller/merchant point-of-sale device configured to receive buyer identification data, seller identification data and a transaction amount, and to select and implement one or more of a variety of disparate buyer and/or seller accounts and related system using the received data. Such modifications and changes do not depart from the true spirit and scope of the present disclosure.

What is claimed is:

1. A computer circuit arrangement to facilitate electronic payment between disparate autonomous payment networks respectively having network-specific payment processing protocols, the circuit arrangement comprising:
   a point-of-sale interface circuit configured and arranged to receive, for each transaction, electronic point-of-sale transaction data from a remote point-of-sale device, the point-of-sale transaction data including data read from a participant's card;
   a plurality of payment network interface modules configured and arranged to electronically communicate with associated payment networks using protocols specific to the associated payment network to which communications are sent; and
   a control processor circuit configured and arranged to, for each transaction and point-of-sale transaction data received therefor,
      use the point-of-sale transaction data, including the data read from the participant's card, to identify participant ID data for at least one participant in the transaction,
      retrieve business rules data electronically associated with the participant ID data, the business rules data including information identifying rewards programs associated with the associated payment networks,
      assign different relative monetary values to rewards points provided by each of the rewards programs,
      compare the rewards programs using the retrieved business rules data, the comparison including a comparison of, for each of the associated payment networks, a net cost to the at least one participant using indications, from the retrieved business rules, of fees and rewards calculated using the relative monetary values associated with each of the associated payment networks,
      select one of the payment network interface modules to process electronic payment for the transaction based, at least in part, upon the comparison of the rewards programs, and
      control the selected payment network interface module to electronically communicate payment data for the transaction data to the network interface module's associated payment network, using protocols specific to the associated payment network, to facilitate payment for the transaction.

2. The circuit arrangement of claim 1, wherein the control processor circuit is further configured to
   determine the net cost to the at least one participant of both fees and rewards associated with processing payment for the transaction using respective ones of the associated payment networks, based on the assigned monetary values, and
   comparing the determined net costs for processing payment via the respective ones of the associated payment networks.

3. The circuit arrangement of claim 1, wherein the control processor circuit is further configured to compare the rewards programs by accessing rewards goals set by a participant corresponding to the identified participant ID data and by comparing an electronic device identified by the rewards goals to device-based rewards provided by each rewards program, the electronic device being a self-powered device via which the data from the participant's card is communicated.

4. The circuit arrangement of claim 1, wherein the control processor circuit is further configured to assess the rewards programs according to a prediction of future redemption requests and to use the assessment of the rewards programs in the comparison of the rewards programs.

5. The circuit arrangement of claim 1, further including one or more computer processors and a processor-readable non-transitory storage medium having instructions stored thereon that when executed by the one or more computer processors perform steps to facilitate electronic payment between disparate autonomous payment networks respectively having network-specific payment processing protocols using the point-of-sale interface circuit, the payment network interface modules and the control processor circuit, the steps including:
   receiving, for each transaction, electronic point-of-sale transaction data from a remote point-of-sale device;
   electronically communicating with associated payment networks using protocols specific to the associated payment network to which communications are sent; and
   for each transaction and point-of-sale transaction data received therefor,
      using the point-of-sale transaction data to access participant identification data for at least one participant in the transaction,
      retrieving business rules data electronically associated with the participant ID data,
      calculating, for each of the associated payment networks, a net cost to the at least one participant using indications, from the retrieved business rules, of fees and rewards associated with each of the associated payment networks,
      using the calculated net cost to select one of the payment networks to process electronic payment for the transaction, and
      controlling the selected payment network to electronically communicate payment data for the transaction data to the associated payment network, using protocols specific to the associated payment network, to facilitate payment for the transaction.

6. The circuit arrangement of claim 5, wherein the net cost includes costs determined for both a seller and a buyer identified by the participant identification data.

7. The circuit arrangement of claim 5, wherein the steps further include grouping transactions into a reduced number of transactions, the grouping being set according to the net cost and submitting the grouped transactions to the selected payment network.

8. The circuit arrangement of claim 5, wherein the steps further include, identifying an account to credit a monetary redemption as a function of account balances.

9. The circuit arrangement of claim 1, further including a processor-readable non-transitory storage medium having instructions stored thereon for performing steps to facilitate electronic payment between disparate autonomous payment networks respectively having network-specific payment processing protocols using the point-of-sale interface circuit, the payment network interface modules and the control processor circuit, the steps including:
   receiving, for each transaction, electronic point-of-sale transaction data from a remote point-of-sale device;
   electronically communicating with associated payment networks using protocols specific to the associated payment network to which communications are sent; and
   for each transaction and point-of-sale transaction data received therefor, using the point-of-sale transaction data to identify participant ID data for at least one participant in the transaction,
retrieving business rules data electronically associated with the participant ID data,
identifying, from the retrieved business rules, a rewards goal associated with one or more of the associated payment networks,
using the identified rewards goal to select one of the payment networks to process electronic payment for the transaction, and
controlling the selected payment network to electronically communicate payment data for the transaction data to the associated payment network, using protocols specific to the associated payment network, to facilitate payment for the transaction.

10. The circuit arrangement of claim 1, further comprising:
at least one computer-readable non-transitory storage medium having instructions stored thereon;
one or more computer processors that implement the point-of-sale interface circuit, the payment network interface modules and the control processor circuit by executing the instructions to facilitate electronic payment between disparate autonomous payment networks respectively having network-specific payment processing protocols, by
receiving, for each transaction, electronic point-of-sale transaction data from a remote point-of-sale device;
electronically communicating with associated payment networks using protocols specific to the associated payment network to which communications are sent;
for each transaction and point-of-sale transaction data received therefor,
using the point-of-sale transaction data to identify participant ID data for at least one participant in the transaction,
retrieving business rules data electronically associated with the participant ID data,
using the retrieved business rules data to select one of the payment networks to process electronic payment for the transaction, and
controlling the selected payment network to electronically communicate payment data for the transaction data to the associated payment network, using protocols specific to the associated payment network, to facilitate payment for the transaction;
accumulating, for the at least one participant, a shared pool of rewards points in response to use of different ones of the associated payment networks to facilitate payment for transactions; and
redeeming the rewards points from the shared pool to provide a reward to the at least one participant.

11. A computer circuit arrangement of claim 1, wherein the control processor circuit is further configured to delay the communication of the payment data for the transaction data to the network interface module's associated payment network until after a plurality of transactions have accumulated and to process the plurality of transactions as a single transaction through the selected payment networks.

12. The computer circuit arrangement of claim 1, further including the point-of-sale device, the point-of-sale device being configured and arranged to read the data from the participant's card.

13. A system comprising:
at least one processor-readable non-transitory storage medium having instructions stored thereon;
one or more computer processors that when executing the instructions are configured to facilitate electronic payment between disparate autonomous payment networks respectively having network-specific payment processing protocols by:
receiving, for each transaction, electronic point-of-sale transaction data from a remote point-of-sale device, the point-of-sale transaction data including data read from a participant's card;
electronically communicating with associated payment networks using protocols specific to the associated payment network to which communications are sent; and
for each transaction and point-of-sale transaction data received therefor,
using the point-of-sale transaction data, including the data read from the participant's card, to identify participant ID data for at least one participant in the transaction,
retrieving business rules data electronically associated with the participant ID data,
determining, for the plurality of payment networks, eligibility of the transaction for one or more rewards programs,
assign different relative monetary values to rewards points provided by each rewards program;
determining a net cost of both fees and monetary values of rewards points associated with processing payment for the transaction using respective ones of the payment networks, and
selecting one of the payment networks to process electronic payment for the transaction based on each of the determined net cost for the respective ones of the payment networks, the retrieved business rules data and the determination of eligibility, and
controlling the selected payment network to electronically communicate payment data for the transaction data to the selected payment network, using protocols specific to the selected payment network, to facilitate payment for the transaction.

14. The system of claim 13, wherein the one or more computer processors are configured and arranged to, when executing the instructions, facilitate electronic payment between the disparate autonomous payment networks by:
identifying, from the retrieved business rules, whether the transaction qualifies for automated savings participation,
using the retrieved business rules data to select a second one of the payment networks to process electronic payment for the transaction,
controlling the selected payment network to electronically communicate payment data for the transaction data to the second payment network, using protocols specific to the second payment network, to facilitate payment for the transaction, and
increasing, in response to identifying that the transaction qualifies, the amount of savings in the account for accumulating automated savings.

15. The system of claim 13, wherein the one or more computer processors, when executing the instructions, are further configured to calculate an amount of rewards points as a function of one or more of the existence of an account, changes in value within an account, an existence of multiple accounts and a duration that an account or balance has existed and transfers of balances from other accounts.

16. The system of claim 13, wherein the one or more computer processors, when executing the instructions, are further configured to allow redemption of rewards accumulated from the rewards programs through a social website account of an account holder.

17. The system of claim 13, wherein the one or more computer processors, when executing the instructions, are further configured to pool rewards accumulated from the rewards programs by linking Social Network groups, and to donate the pooled rewards to charity groups.

18. The system of claim 13, wherein the one or more computer processors, when executing the instructions, are further configured to transmit rewards options to participants in response to location information about the participant that is retrieved from a social website.

19. The system of claim 13, wherein the one or more computer processors, when executing the instructions, are further configured to select a reward option for the participant of at least one of the one or more rewards programs by comparing the reward option to a specific device registered with the participant.

20. The system of claim 19, wherein the one or more computer processors, when executing the instructions, are further configured to delay presenting the selected reward option to the participant until after the specific device is used by the participant.

21. The system of claim 13, wherein the one or more computer processors, when executing the instructions, are further configured to hold payment data for the transaction data before controlling the selected payment network, and to allow participating buyers or sellers to select another payment network to facilitate payment for the transaction.

22. The system of claim 13, wherein the one or more computer processors, when executing the instructions, are further configured to consolidate multiple transactions over a period of time before submitting the consolidated transactions as a single transaction to the selected payment network.

23. The system of claim 22, wherein the one or more computer processors, when executing the instructions, are further configured to perform the consolidation in response to a fee structure for the selected payment network, and to compute the net cost for submitting the consolidated transactions as including a single transaction fee, relative to multiple transaction fees associated with submitting each transaction separately.

24. The system of claim 13, wherein the one or more computer processors, when executing the instructions, are further configured to hold a transaction amount corresponding to the transaction data in a temporary account and to issue the transaction data to a payment network in response to the transaction amount exceeding a credit threshold amount.

25. The system of claim 13, wherein the one or more computer processors, when executing the instructions, are further configured to assess risk for parties that underwrite for disparate autonomous payment networks and wherein the selection of one of the payment networks is in response to the assessment of risk.

26. The system of claim 13, wherein the one or more computer processors, when executing the instructions, are further configured to assess risk for buyers and sellers using the disparate autonomous payment networks and wherein the selection of one of the payment networks is in response to the assessment of risk.

27. The system of claim 13, wherein one of the one or more computer processors is further configured and arranged to, when executing the instructions, operate the point-of-sale device to read the data from the participant's card.

* * * * *